(12) United States Patent
Abbott et al.

(10) Patent No.: US 12,482,118 B2
(45) Date of Patent: Nov. 25, 2025

(54) LANDMARK PERCEPTION FOR LOCALIZATION IN AUTONOMOUS SYSTEMS AND APPLICATIONS

(71) Applicant: NVIDIA Corporation, Santa Clara, CA (US)

(72) Inventors: Joshua Edward Abbott, Draper, UT (US); Amir Akbarzadeh, San Jose, CA (US); Joachim Pehserl, Lynnwood, WA (US); Samuel Ogden, Duvall, WA (US); David Wehr, Redmond, WA (US); Ke Chen, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 391 days.

(21) Appl. No.: 18/171,016

(22) Filed: Feb. 17, 2023

(65) Prior Publication Data
US 2024/0281988 A1    Aug. 22, 2024

(51) Int. Cl.
G06T 7/50    (2017.01)
G01S 17/89   (2020.01)

(52) U.S. Cl.
CPC ............ G06T 7/50 (2017.01); G01S 17/89 (2013.01); *G06T 2207/10028* (2013.01); *G06T 2207/20084* (2013.01); *G06T 2207/30256* (2013.01)

(58) Field of Classification Search
None
See application file for complete search history.

(56) References Cited

U.S. PATENT DOCUMENTS

| | | |
|---|---|---|
| 10,885,698 B2 | 1/2021 | Muthler et al. |
| 11,068,724 B2 | 7/2021 | Liu |
| (Continued) | | |

FOREIGN PATENT DOCUMENTS

CN    114694109 A    7/2022

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Catherine T. Rastovski
(74) *Attorney, Agent, or Firm* — Freestone Intellectual Property Law PLLC

(57) ABSTRACT

In various examples, perception of landmark shapes may be used for localization in autonomous systems and applications. In some embodiments, a deep neural network (DNN) is used to generate (e.g., per-point) classifications of measured 3D points (e.g., classified LiDAR points), and a representation of the shape of one or more detected landmarks is regressed from the classifications. For each of one or more classes, the classification data may be thresholded to generate a binary mask and/or dilated to generate a densified representation, and the resulting (e.g., dilated, binary) mask may be clustered into connected components that are iteratively: fitted a shape (e.g., a polynomial or Bezier spline for lane lines, a circle for top-down representations of poles or traffic lights), weighted, and merged. As such, the resulting connected components and their fitted shapes may be used to represent detected landmarks and used for localization, navigation, and/or other uses.

20 Claims, 19 Drawing Sheets

(56) References Cited

U.S. PATENT DOCUMENTS

| | | | |
|---|---|---|---|
| 11,358,598 B2 | 6/2022 | Hartnett et al. | |
| 2020/0249685 A1 | 8/2020 | Elluswamy et al. | |
| 2020/0324795 A1* | 10/2020 | Bojarski | G06N 20/20 |
| 2021/0026355 A1* | 1/2021 | Chen | G01S 17/89 |
| 2021/0150230 A1* | 5/2021 | Smolyanskiy | G06V 10/82 |
| 2021/0166052 A1* | 6/2021 | Park | G06N 3/045 |
| 2021/0272295 A1* | 9/2021 | Ahmadi | G06F 18/23 |
| 2023/0144209 A1 | 5/2023 | Cai et al. | |
| 2024/0185434 A1* | 6/2024 | Wyffels | G06V 20/58 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety", International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems", Retrieved from Internet URL: https://en.wikipedia.org/wiki/IEC_61508, accessed on Apr. 1, 2022, 7 pages.

Sun, P., et al., "OneNet: Towards End-to-End One-Stage Object Detection", arXliv:2012.05780v1, pp. 1-11 (Dec. 10, 2020).

Non-Final Office Action, U.S. Appl. No. 18/171,004, Notification Date: Jan. 13, 2025, 31 pages.

Non-Final Office Action, U.S. Appl. No. 18/171,004, Notification Date: May 28, 2025, 31 pages.

Meier, Kevin, et al. "Visual-inertial curve simultaneous localization and mapping: Creating a sparse structured world without feature points." Journal of Field Robotics 35.4 (2018): 516-544, 29 pages.

Non-Final Office Action, U.S. Appl. No. 18/171,004, Notification Date: Aug. 25, 2025, 33 pages.

Tabelini, Lucas, et al. "Polylanenet: Lane estimation via deep polynomial regression." 2020 25th international conference on pattern recognition (ICPR). IEEE, 2021, 7 pages.

\* cited by examiner

LANDMARK PERCEPTION FOR LOCALIZATION IN AUTONOMOUS SYSTEMS AND APPLICATIONS

CROSS-REFERENCE TO RELATED APPLICATIONS

This application is related to U.S. application Ser. No. 18/171,004, entitled "Machine Learning Based Landmark Perception for Localization in Autonomous Systems and Applications," filed on Feb. 17, 2023.

BACKGROUND

Designing a system to safely drive a vehicle autonomously without supervision or semi-autonomously with limited supervision is tremendously difficult. For example, some designs seek to have an autonomous vehicle or other ego-machine at least be capable of performing as a functional equivalent of an attentive driver—who draws upon a perception and action system that has an incredible ability to identify and react to moving and static obstacles in a complex environment—to avoid other objects or structures along the path of the vehicle. In some scenarios, perception is used for localization (e.g., positioning an ego-machine in a map). For example, autonomous driving perception systems may use localization to locate the ego-machine's precise location in a map, providing an awareness of the road and/or lane being traveled, including upcoming turns, forks, and merging of lanes. One way to perform localization uses perception to detect landmarks that are also represented on the map (e.g., signs, poles, etc.) and match the detected landmarks with those in the map. Localization facilitates making decisions based on environmental features that are beyond the ego-machine's field of view and/or are occluded by other objects or conditions in the environment (e.g., avoiding a last second lane merge when approaching the end of a lane represented in a map). In another example, localization facilitates contextualizing observed behaviors of other actors in the map and making corresponding decisions (e.g., determining that an oncoming vehicle is in a left-turn only lane and, therefore, that the oncoming vehicle will turn left, making it safe for an autonomous vehicle to make an unprotected left turn).

In some situations, it may be useful or important to perform localization using certain types of sensor data (e.g., LiDAR data only) and/or certain types of detected landmarks (e.g., lane lines). One such example might occur in the context of a Level 3 autonomous driving emergency situation when a hardware or software fault necessitates that a backup computing unit quickly localize an autonomous vehicle (e.g., on a highway) using only a LiDAR sensor and steer the autonomous vehicle to safety. However, conventional perception methods do not have this capability. One possible approach might use deep neural network ("DNN") inference to classify LiDAR points from a LiDAR sensor. However, LiDAR points may be too sparse to provide the requisite or desired localization precision (e.g., due to the scanline pattern of the LiDAR sensor). Furthermore, for certain classes of landmarks (e.g., lane lines), per-point classification may be insufficient to match the corresponding landmark in a map using certain localization techniques and/or with the requisite or desired localization precision. One conventional method attempts to find lines in classifications using a Hough transform. However, using this technique, it is difficult to find the correct threshold that yields the correct number of lines. Furthermore, this technique only works efficiently for straight lines and, when roads have curves (which is often the case), the Hough transform has to be generalized and thus becomes less efficient or effective.

As such, conventional perception and localization methods have limited functionality, accuracy, and/or precision, such as when using certain types of sensor data (e.g., LiDAR data only) and/or when detecting certain types of landmarks (e.g., lane lines), limiting the ability to effectively navigate an autonomous vehicle though an environment.

SUMMARY

Embodiments of the present disclosure relate to perception of landmark shapes for localization in autonomous or semi-autonomous systems and applications. Systems and methods are disclosed that that use object detection techniques to identify or detect instances of street furniture (e.g., objects and/or pieces of equipment installed along streets and roads for various purposes) or other landmarks (e.g., traffic lights, traffic signs, lane lines, road boundaries, poles) for use in localization, navigation, and/or other uses by autonomous vehicles, semi-autonomous vehicles, robots, and/or other object or machine types.

In contrast to conventional systems, such as those described above, in some embodiments, a deep neural network (DNN) is used to generate (e.g., per-point) classifications of measured 3D points (e.g., classified LiDAR points), and a representation of the shape of one or more detected landmarks is regressed from the classifications. For each of one or more classes, the classification data may be thresholded to generate a binary mask and/or dilated to generate a densified representation, and the resulting (e.g., dilated, binary) mask may be clustered into connected components that are iteratively: fitted to a shape (e.g., a polynomial or Bezier spline for lane lines, a circle for top-down representations of poles or traffic lights), weighted, and merged. As such, the resulting connected components and their fitted shapes may be used to represent detected landmarks that may be used to perform one or more operations with respect to localization, navigation, and/or other uses.

In some embodiments, a DNN may be used to jointly generate classifications of measured 3D points using one output head (e.g., a classification head) and regress a representation of one or more fitted shapes (e.g., polylines, circles) using a second output head (e.g., a regression head). The classification head may predict classification data (e.g., 2D or 3D confidence maps for any number of classes), and the regression head may predict shape regression data representing one or more fitted 2D or 3D shapes of detected landmarks represented in the measured 3D points. For example, the classification data may comprise one or more channels that represent confidence maps for different classes (e.g. lane lines, poles, background, etc.), and the shape regression data may comprise one or more channels that represent regressed parameters of a regressed 2D or 3D shape associated with a candidate anchor point represented by each pixel. The classification data may be thresholded to identify a set of anchor points (e.g., excluding pixels predicted to be part of the background), and, for each resulting anchor point (pixel), corresponding regressed parameters for fitted shapes may be obtained from the shape regression data (e.g., a depth-wise vector predicted by the regression head) for that pixel.

In some embodiments, multiple DNNs (e.g., a chain of multiple DNNs or multiple stages of a DNN) are used to sequentially generate classifications of measured 3D points and a regressed representation of the shape of one or more detected landmarks. For example, a first (stage of a) DNN may be used to extract classification data (e.g., confidence maps for any number of classes) from any suitable input (e.g., a projection image, a multi-channel projection image or tensor, etc.), and a second (stage of the) DNN may be used to extract shape regression data representing one or more fitted 2D or 3D shapes represented in the classification data. In some such embodiments, the classification DNN (or stage) operates similarly as the classification head described above, and the regression DNN (or stage) operates similarly as the regression head described above, except the two DNNs (or stages) are serialized rather than output from the same encoder/decoder trunk of the DNN.

As such, the extracted classification data and shape regression data may be decoded, and the resulting classified landmarks and corresponding fitted shapes may be used for localization, navigation, and/or other uses.

BRIEF DESCRIPTION OF THE DRAWINGS

The present systems and methods for landmark shape perception for localization in autonomous and semi-autonomous systems and applications are described in detail below with reference to the attached drawing figures, wherein.

DETAILED DESCRIPTION

Figure 1:
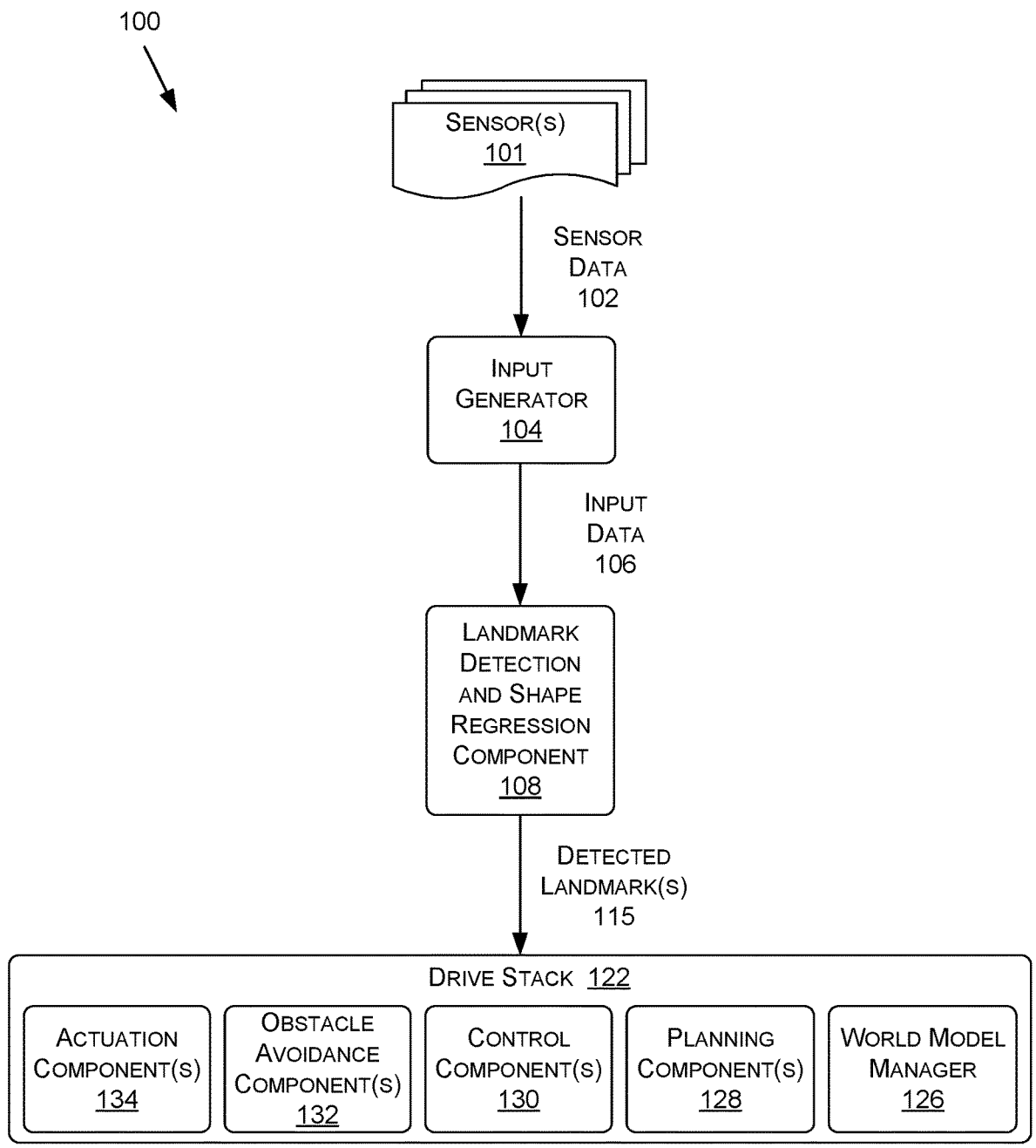
FIG. 1 is a data flow diagram illustrating an example process for a landmark detection and shape regression system, in accordance with some embodiments of the present disclosure.

Systems and methods are disclosed related to landmark shape perception for localization in autonomous or semi-autonomous systems and applications. For example, systems and methods are disclosed that use object detection techniques to identify or detect instances of street furniture or other landmarks (e.g., traffic lights, traffic signs, lane lines, road boundaries, poles) for use in localization, navigation, and/or other uses by autonomous vehicles, semi-autonomous vehicles, robots, and/or other object or machine types. Although the present disclosure may be described with respect to an example autonomous or semi-autonomous vehicle or machine 1200 (alternatively referred to herein as "vehicle 1200" or "ego-machine 1200," an example of which is described with respect to FIGS. 12A-12D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to localization in autonomous or semi-autonomous systems and applications, this is not intended to be limiting, and the systems and methods described herein may be used in augmented reality, virtual reality, mixed reality, robotics, security and surveillance, autonomous or semi-autonomous machine applications, and/or any other technology spaces where object detection, localization, and/or navigation may be used.

At a high level, one or more DNNs may be used to detect objects and regress a representation of their shape using LiDAR data and/or other sensor data representing a three-dimensional (3D) environment. In some embodiments, a DNN is used to generate (e.g., per-point) classifications of measured 3D points (e.g., classified LiDAR points), and a representation of the shape of one or more detected landmarks is regressed from the classifications (e.g., performing a connected components on a two-dimensional (2D) representation of the classifications and fitting one or more shapes to connected components in the 2D representation, or using a DNN to regress a representation of one or more fitted polylines or circles). In some embodiments, a DNN is used to jointly generate classifications of measured 3D points from one output head (e.g., a classification head) and regress a representation of one or more fitted shapes (e.g., polylines, circles) from a second output head (e.g., a regression head).

More specifically, in some embodiments, a DNN is used to generate (e.g., per-point) classifications of measured 3D points (e.g., classified LiDAR points), and a representation of the shape of one or more detected landmarks is regressed from the classifications. For example, in some embodiments, the input to the DNN is formed from measured 3D points (e.g., a projection image, a multi-channel projection image or tensor representing locations, intensities, elevations, etc. of the measured 3D points) and/or data from other sensors (e.g., images and/or tensors formed with images from any number of cameras), and the DNN may use any known technique to extract classification data (e.g., confidence maps for any number of classes) from the input. For each of one or more classes, the classification data may be thresholded to generate a binary mask and/or dilated to generate a densified representation, and the resulting (e.g., dilated, binary) mask may be clustered into connected components that are iteratively: fitted to a shape (e.g., a polynomial or Bezier spline for lane lines, a circle for top-down representations of poles or traffic lights, etc.), weighted, and merged (e.g., absorbing connected components associated with lower weighted fitted shapes into connected components associated with higher weighted fitted shapes). As such, the one or more (merged) connected components generated for a particular class (representing classified landmarks) may each be associated with a fitted shape, and the classified landmarks and corresponding fitted shapes may be used for localization, navigation, and/or other uses.

In some embodiments, instead of—or in addition to—generating classifications in a first step and then regressing shape in a second step, a DNN may be used to jointly generate classifications of measured 3D points using one output head (e.g., a classification head) and regress a representation of one or more fitted shapes (e.g., polylines, circles) using a second output head (e.g., a regression head). In some embodiments, the DNN includes one or more input heads, where the input to an input head is formed from measured 3D points (e.g., a projection image, a multi-channel projection image or tensor representing locations, intensities, elevations, etc. of the measured 3D points) and/or data from other sensors (e.g., images and/or tensors formed with images from any number of cameras). In an example embodiment, one input head evaluates a projected representation of measured 3D points in one view (e.g., top-down) and a second input head evaluates a projected representation of the measured 3D points in a second view (e.g., perspective view). In some such embodiments, extracted features generated by one of the inputs heads are projected into the other view and fused with the extracted features generated by the other input head. The DNN may include an encoder/decoder trunk (e.g., implemented using a transformer architecture) with two output heads, a classification head and a regression head, which may classify and regress (respectively) in any view. The classification head may predict classification data (e.g., 2D or 3D confidence maps for any number of classes), and the regression head may predict shape regression data representing one or more fitted 2D or 3D shapes of detected landmarks represented in the measured 3D points and the classification data. For example, the classification data may include one or more channels that represent confidence maps for different classes (e.g., lane lines, poles, background, etc.), and the shape regression data may include one or more channels that represent regressed parameters of a regressed 2D or 3D shape associated with a candidate anchor point represented by each pixel. Example regressed parameters include control points for a fitted Bezier spline, polynomial coefficients for a fitted polynomial, a representation of radius for a fitted circle, and/or others. The predicted classification and shape regression data may be decoded in any suitable manner. For example, the classification data may be thresholded to identify a set of anchor points (e.g., excluding pixels predicted to be part of the background), and, for each resulting anchor point (pixel), corresponding regressed parameters for fitted shapes may be obtained from the shape regression data (e.g., a depth-wise vector predicted by the regression head) for that pixel. As such, the resulting classified landmarks and corresponding fitted shapes may be used for localization, navigation, and/or other uses.

In some embodiments, multiple DNNs (e.g., a chain of multiple DNNs or multiple stages of a DNN) are used to sequentially generate classifications of measured 3D points and a regressed representation of the shape of one or more detected landmarks. For example, a first (stage of a) DNN may be used to extract classification data (e.g., confidence maps for any number of classes) from any suitable input (e.g., a projection image, a multi-channel projection image or tensor), and a second (stage of the) DNN may be used to extract shape regression data representing one or more fitted 2D or 3D shapes represented in the classification data. In some such embodiments, the classification DNN (or stage) operates similarly as the classification head described above, and the regression DNN (or stage) operates similarly as the regression head described above, except the two DNNs (or stages) are serialized rather than output from the same encoder/decoder trunk. In some embodiments, the classification data extracted by the classification DNN (or stage) is fed into the regression DNN (or stage). In some embodiments, the classification data (e.g., for the class represented in each channel) may be thresholded to generate a binary mask and/or dilated to generate a densified representation, and the resulting (e.g., dilated, binary) mask (in each channel) may be fed into the regression DNN (or stage) to extract shape regression data. As such, the extracted classification data and shape regression data may be decoded, and the resulting classified landmarks and corresponding fitted shapes may be used for localization, navigation, and/or other uses.

As such, the techniques described herein may be used to detect, classify, and regress on the shape of one or more landmarks, and the detected landmarks may be provided to an autonomous or semi-autonomous vehicle drive stack to aid in the performance in one or more operations related to localization, safe planning, and/or control of the vehicle. As such, detected landmark shapes may aid an autonomous or semi-autonomous vehicle in navigating a physical environment, and specifically may aid in localization using only LiDAR data for more accurate and reliable navigation. Unlike conventional approaches, various embodiments provide a way to detect lane lines (e.g., solid lane lines, dotted lane lines) and other object classes—and regress their shape—using only LiDAR data, thereby allowing for a faster and more precise localization than in conventional methods.

With reference to FIG. 1, FIG. 1 is a data flow diagram illustrating an example process 100 for a landmark detection and shape regression system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1200 of FIGS. 12A-12D, example computing device 1300 of FIG. 13, and/or example data center 1400 of FIG. 14.

At a high level, the process 100 uses a landmark detection and shape regression component 108 which may include one or more machine learning models configured to detect landmarks (or other objects) and/or regress their shapes, based on sensor data 102 of a three dimensional (3D) environment. The sensor data 102 may be pre-processed by an input generator 104 into input data 106 that has a format that the landmark detection and shape regression component 108 is configured to accept and process, and the input data 106 may be fed into the landmark detection and shape regression component 108 to detect landmark(s) 115 in the 3D environment.

In some embodiments, object detection may be performed using sensor data 102 from any number and any type of sensor, such as, without limitation, LiDAR sensors, RADAR sensors, cameras, and/or other sensor types such as those described below with respect to the autonomous vehicle 1200. For example, the sensor(s) 101 may include one or more sensor(s) 101 of an ego-machine—such as LiDAR sensor(s) 1264 of the autonomous vehicle 1200—and the sensor(s) 101 may be used to generate sensor data 102 that represents objects in the 3D environment around the ego-machine.

Taking LiDAR data as an example, object detection may be performed using LiDAR data (e.g., sensor data 102) from one or more LiDAR sensors (e.g., sensor(s) 101). Generally, a LiDAR system may include a transmitter that emits pulses of laser light. The emitted light waves reflect off of certain objects and materials, and one of the LiDAR sensors may detect these reflections and reflection characteristics such as bearing, azimuth, elevation, range (e.g., time of beam flight), intensity, reflectivity, signal-to-noise ratio (SNR), and/or the like. Reflections and reflection characteristics may depend on the objects in the environment, speeds, materials, sensor mounting position and orientation, etc. Firmware associated with the LiDAR sensor(s) may be used to control LiDAR sensor(s) to capture and/or process the sensor data 102, such as reflection data from the sensor's field of view.

Generally, the sensor data 102 may include raw sensor data, LiDAR point cloud data, and/or reflection data processed into some other format. For example, reflection data may be combined with position and orientation data (e.g., from GNSS and IMU sensors) to form a point cloud representing detected reflections from the environment. Each detection in the point cloud may include a three dimensional location of the detection and metadata about the detection such as one or more of the reflection characteristics. Although some embodiments describe the sensor data 102 as LiDAR data, the sensor data 102 may additionally or alternatively include sensor data from other sensors, such as RADAR data (e.g., RADAR point clouds), image data (e.g., RBG images from one or more cameras mounted around an ego-machine), ultrasonic data, and/or other types.

The input generator 104 may process the sensor data 102 into a format that the landmark detection and shape regression component 108 accepts (e.g., the input data 106). For example, in some embodiments in which the sensor data 102 includes a representation of measured 3D points (e.g., LiDAR or RADAR point clouds), the input generator 104 may accumulate the measured 3D points (and/or other data) (e.g., over a designated number of time slices, LiDAR or RADAR spins, etc.), transform the measured 3D points to a single coordinate system (e.g., centered around an origin of a rig coordinate system of the ego-machine), ego-motion-compensate the measured 3D points (e.g., to a latest known position of the ego-machine), and/or project the measured 3D points to form a projection image representing any suitable view of the 3D environment (e.g., perspective, orthographic), having any number of channels (e.g., a single channel image, a multi-channel image or tensor) representing any characteristic of the sensor data 102 (e.g., projected position of a measured 3D point, one or more reflection characteristics, image data such as pixel color, etc.). For example, an (accumulated, ego-motion-compensated) LiDAR point cloud may be projected to form a LiDAR range image with a perspective view or a top-down representation of projected 3D locations of measured 3D points (e.g., a height map), with any number of channels (e.g., storing intensity, elevation or range profile, etc.). In some embodiments that use a perspective projection, any suitable perspective projection may be used (e.g., spherical, cylindrical, pinhole, etc.). In some cases, the type of projection may depend on the type of sensor. By way of non-limiting example, for spinning sensors, a spherical or cylindrical projection may be used. In some embodiments, for a time-of-flight camera (e.g., Flash-LiDAR), a pinhole projection may be used. In some embodiments, different sensor(s) 101 (whether the same type or a different of sensor) may be used to generate different modalities of sensor data 102 (e.g., LiDAR range images, camera images, etc.) having the same (e.g., perspective) view of the 3D environment in a common image space, and sensor data 102 from the different sensors 101 or sensor modalities may be stored in different channels of a multi-channel image or tensor. These are meant simply as examples, and other variations are contemplated within the scope of the present disclosure.

For example, a frame may correspond to a full-spin accumulated LiDAR 3D point cloud that has been ego-motion-compensated to a defined time point within the spin. While any given frame by itself may only yield a limited number of scan lines on a target object or surface (e.g., a road surface), leveraging multiple frames (e.g., representing 100 meters or 3 seconds) may yield a dense 3D point cloud that densely represents the target object or surface. In some embodiments, a sliding window of multiple frames may be used to build a dense 3D point cloud. As such, a dense 3D point cloud may be projected into an image (e.g., an orthographic surface image showing reflectance of lane lines as pixel values).

In some embodiments, a projection image (or tensor) may include multiple layers, with pixel values for the different layers storing different types of sensor data and/or reflection characteristics. In some embodiments, for each pixel that bins sensor data representing multiple reflections, a set of features may be calculated, determined, or otherwise selected from reflection characteristics of the reflections (e.g., bearing, azimuth, elevation, range, intensity, reflectivity, SNR, etc.). In some cases, when sensor data representing multiple reflections is binned together in a pixel of a projection image (e.g., a range image), sensor data representing one of the reflections (e.g., the reflection with the closest range) may be represented in the projection image, and the sensor data representing the other reflections may be dropped. For example, in a range image with a pixel that bins multiple reflections together, the pixel may store a range value corresponding to the reflection with the closest range. Additionally or alternatively, when there are multiple reflections binned together in a pixel, thereby forming a tower of points, a particular feature for that pixel may be calculated by aggregating a corresponding reflection characteristic for the multiple overlapping reflections (e.g., using standard deviation, average, etc.). Generally, any given pixel may have multiple associated features values, which may be stored in corresponding channels of a multi-channel image or tensor.

Figure 2:
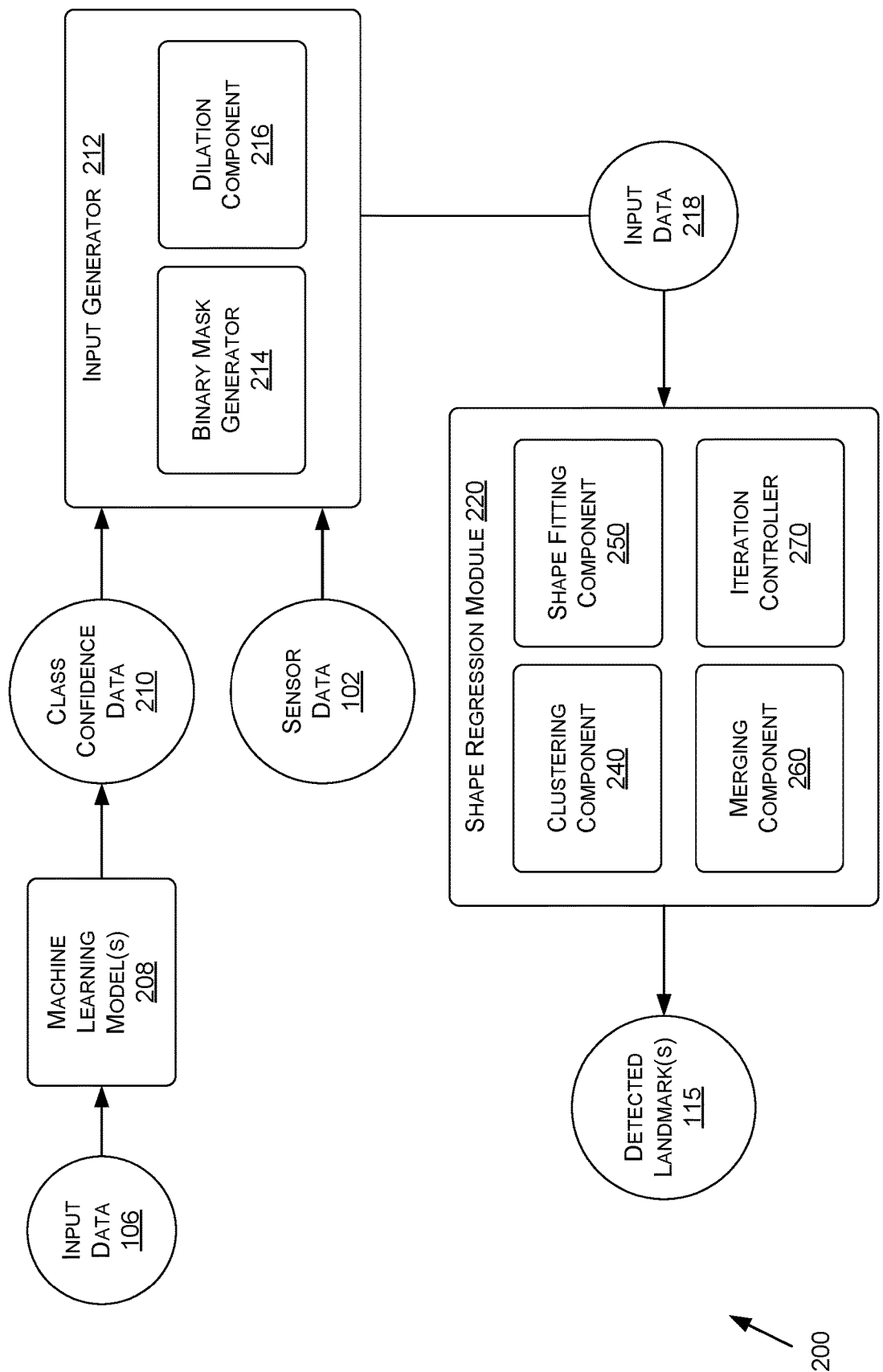
FIG. 2 is a data flow diagram illustrating an example process for regression of landmark shapes based on a connected components analysis, in accordance with some embodiments of the present disclosure.
Figure 4:
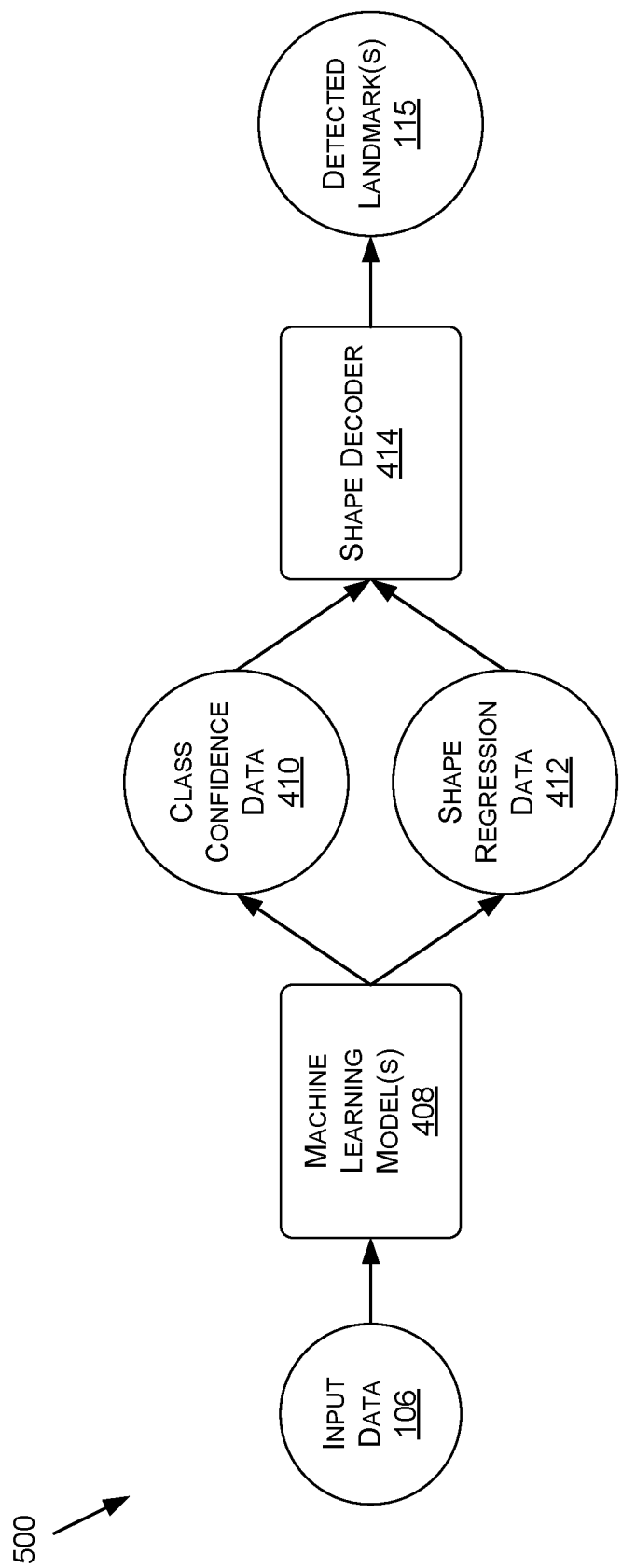
FIG. 4 is a data flow diagram illustrating an example process for landmark detection and shape regression using one or more machine learning models, in accordance with some embodiments of the present disclosure.
Figure 5:
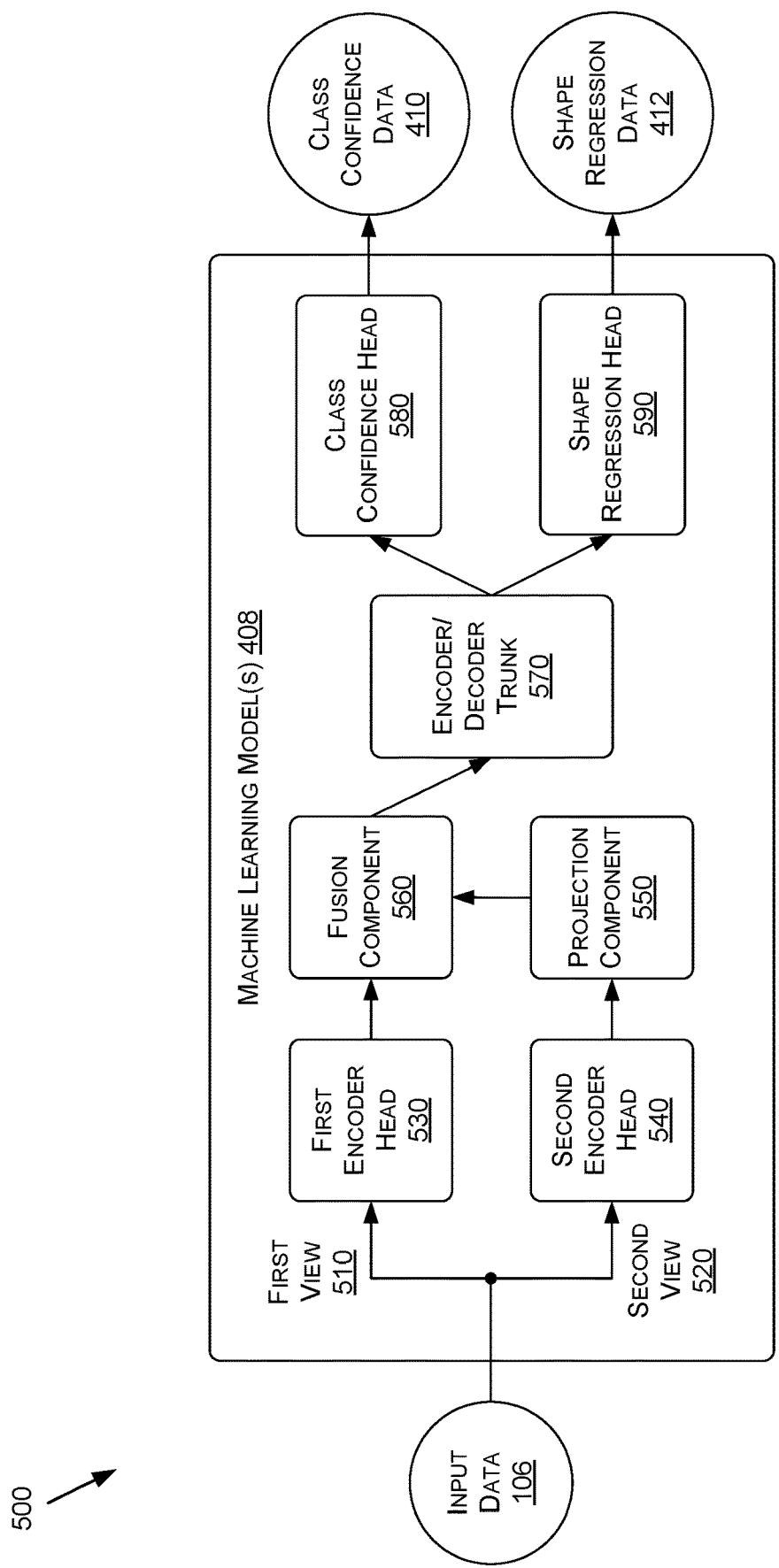
FIG. 5 is a data flow diagram illustrating an example process for jointly predicting classifications and regressing shapes using one or more machine learning models, in accordance with some embodiments of the present disclosure.
Figure 9:
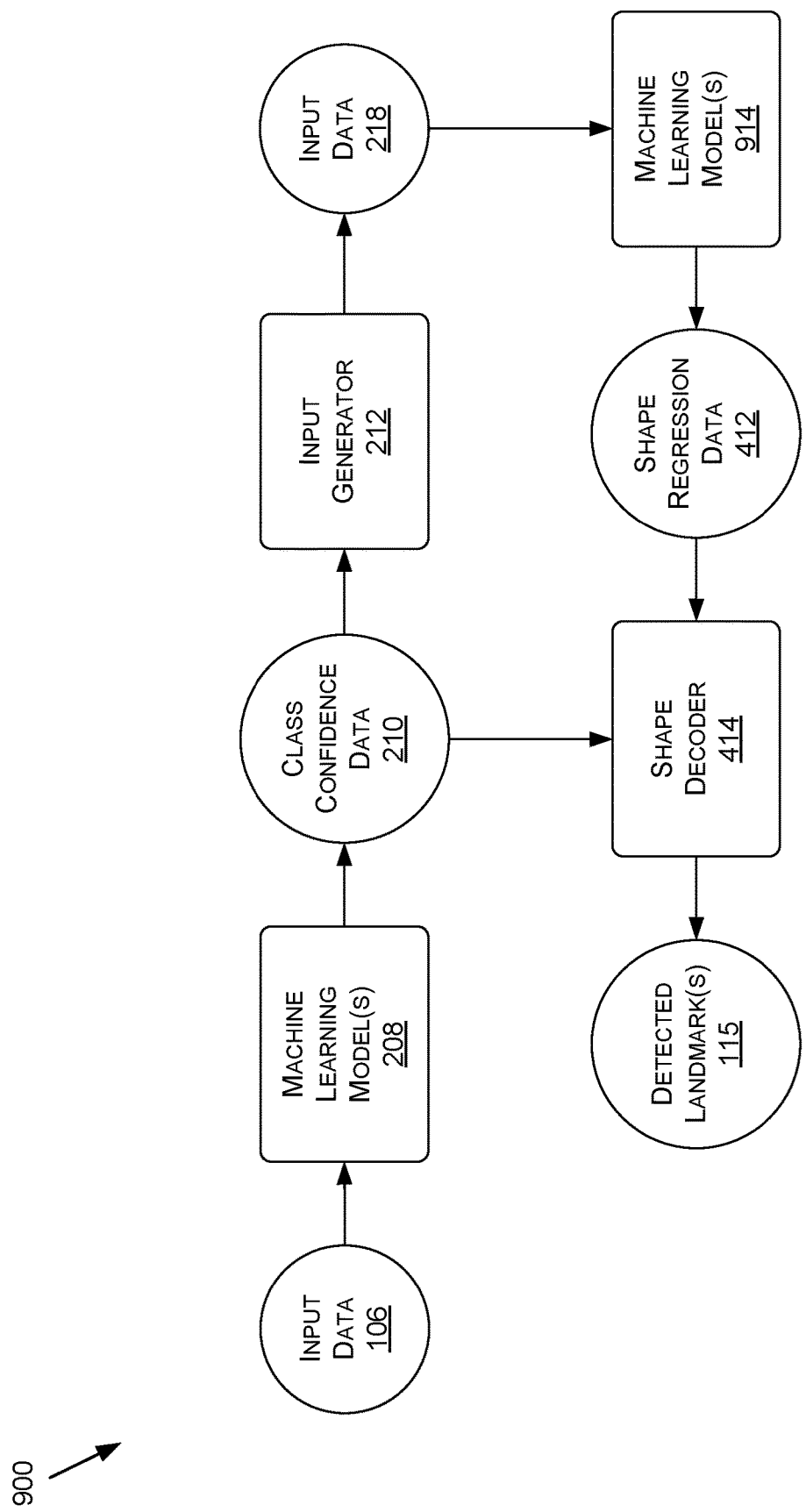
FIG. 9 is a data flow diagram illustrating an example process for sequentially predicting classifications and regressing shape using one or more machine learning models, in accordance with some embodiments of the present disclosure.

At a high level, the landmark detection and shape regression component 108 may include one or more machine learning models configured to detect landmarks (or other objects) and/or regress their shapes using the input data 106. Depending on the embodiment, the landmark detection and shape regression component 108 may take various forms. For example, and as explained in more detail below, FIG. 2 illustrates an implementation in which the landmark detection and shape regression component 108 includes one or more machine learning models 208 that extract class confidence data 210 from the input data 106, and a shape regression module 220 that regresses landmark shape using a connected component analysis. FIGS. 4, 5, and 9 illustrate implementations in which the landmark detection and shape regression component 108 includes one or more machine learning models that regress a landmark shape. FIG. 5 illustrates an implementation in which the landmark detection and shape regression component 108 includes one or more machine learning models 408 that jointly predict class confidence data 410 and shape regression data 412 using different output heads. FIG. 9 illustrates an implementation in which the landmark detection and shape regression component 108 includes one or more machine learning models 208 that extract class confidence data 210 from the input data 106, followed by one or more machine learning models 914 that extract shape regression data 412 from a representation of the class confidence data 210. In some embodiments, landmark detection and shape regression component 108 implements multiple techniques in parallel (e.g., some or all of the implementations illustrated in FIGS. 4, 5, and 9) to detect landmarks or other objects and/or regress their shapes using the input data 106 (e.g., inputting the same projection image into multiple detection and/or regression techniques). These are just a few examples, and other variations are contemplated within the scope of the present disclosure.

More specifically, and turning to FIG. 2, FIG. 2 is a data flow diagram illustrating an example process 200 for regressing on landmark shapes based on a connected components analysis, in accordance with some embodiments of the present disclosure. In some embodiments, the process 200 represents a possible way for the landmark detection and shape regression component 108 of FIG. 1 to detect landmarks (or other objects) and/or regress their shapes using the input data 106.

FIG. 2 illustrates one or more machine learning models 208 that extract class confidence data 210 from the input data 106, an input generator 212 that processes the sensor data 102 and/or class confidence data 210 into a format that the shape regression module 220 accepts (input data 218) and feeds the input data 218 into the shape regression module 220, which may regress the shape of one or more detected landmark(s) 115.

At a high level, the machine learning model(s) 208 may extract classification data (e.g., the class confidence data 210) representing detected landmarks and/or other objects represented in the input data 406. The class confidence data 210 may take the form of one or more confidence maps (e.g., a confidence map for each of a plurality of supported classes in each channel). For any particular class, the input generator 212 may process the sensor data 102 and/or the class confidence data 210 into input data 218 (e.g., a binary and/or dilated mask for one or more classes), and the shape regression module 220 may regress the shape(s) of one or more detected landmark(s) 115 represented in the input data 218.

In some embodiments, the machine learning model(s) 208 may extract the class confidence data 210 using any known technique. For example, the machine learning model(s) 208 (and other machine learning model(s) described herein) may include, without limitation, a feature extractor (e.g., a DNN, an encoder/decoder, etc.) including convolutional layers, transformer layers, pooling layers, and/or other layer types, and may output any number of layers and/or output heads that serve to extract confidence data 210 for a corresponding class. Any number and type of supported class (e.g., one channel per class) is possible. Examples of supported classes may include street furniture or other landmarks (e.g., traffic lights, traffic signs, lane lines (e.g., dotted lane lines, solid lane lines), road boundaries, poles, streetlamps, benches, traffic barriers, bollards, post boxes, phone boxes, bus stops, tram stops, taxi stands, fountains, watering troughs, memorials, public sculptures, waste receptacles), vehicles (e.g., cars, buses, trucks, etc.), vulnerable road users ("VRUs") (e.g., motorcycles, bikes, pedestrians, etc.), environmental parts (e.g., drivable space, sidewalks, buildings, trees, etc.), subclasses thereof (e.g., walking pedestrian), some combination thereof, and/or others. For example, the class confidence data 210 may include a representation of one or more confidence maps (e.g., one per class). By way of nonlimiting example, the machine learning model(s) 208 may output a multi-channel image or tensor with N channels corresponding to N classes (e.g., one confidence map per channel). Thus, each pixel in the image or tensor may store depth-wise pixel values representing a probability, score, or logit that the pixel is part of a corresponding class for each channel. In some embodiments, the sum of depth-wise pixel values is normalized to some value (e.g., 1).

In at least embodiments corresponding to the illustration of FIG. 2, the input generator 212 processes the sensor data 102 and/or class confidence data 210 into a format that the shape regression module 220 accepts. For example and taking LiDAR as an example, the machine learning model(s) 208 may extract the class confidence data 210 from input data 106 representing any number of LiDAR sensors, time slices, LiDAR sensor spins, and/or the like. The class confidence data 210 may be backprojected into the same 3D coordinate system as the underlying 3D LiDAR points, and/or a pixel correspondence between input and output of the machine learning model(s) 208 may be used to associate classified pixels with 3D LiDAR points, thereby generating per-point LiDAR classifications (e.g., a classification for each of 200$k$ or more points per scan). Accumulation and/or ego-motion compensation may occur before and/or after classification by the machine learning model(s) 208. In some embodiments in which accumulation and/or ego-motion compensation occur after classification by the machine learning model(s) 208, the input generator 212 may accumulate and/or ego-motion compensate classified measured 3D points (e.g., classified LiDAR 3D points) from any number of sensors, time slices, sensor spins, and/or the like, and may generate a different projection image for each class, representing any view of the 3D environment (e.g., perspective, orthographic). In some embodiments in which historical data generated and/or observed during previous time slices is accumulated, the projection image may use a top-down view, a perspective pinhole projection, and/or a view that captures a substantial region of the 3D environment previously traversed by the ego-machine (e.g., a top-down view in which a car is one third of the way down from the top of the image, with the remaining two thirds representing a region behind the car). As such, the input generator 212 may generate a projection image (e.g., for each class) representing the projected positions of classified measured 3D points, their corresponding predicted confidence values, and/or other characteristics of the measured 3D points. These projection images may be understood as projected classification images.

In the embodiment illustrated in FIG. 2, the input generator 212 includes a binary mask generator 214 and a dilation component 216. In some embodiments that involve multi-class prediction, the binary mask generator 214 applies thresholding to convert each projected classification image into a binary mask. The dilation component 216 may dilate each binary mask (and/or each projected classification image) using any known technique to generate a densified representation to compensate for potential sparseness in the underlying sensor data (e.g., measured LiDAR points representing detected lane lines). Binary mask generation and dilation may be applied in any order to generate the input data 218 (e.g., one or more binary masks representing a corresponding projected classification image).

In the embodiment illustrated in FIG. 2, the shape regression module 220 regresses landmark shape from the input data 218 (e.g., in each binary mask of the input data 218) using a connected component analysis, and includes a clustering component 240, a shape fitting component 250, a merging component 260, and an iteration controller 270. At a high level, for each binary mask in the input data, the clustering component 240 may perform any known connected components analysis to identify connected components (e.g., groups of pixels of the same class) in the binary mask, and the iteration controller 270 may control one or more iterations of the shape fitting component 250 fitting shapes (e.g., polynomials, Bezier splines) to the connected components and the merging component 260 merging connected components.

In some embodiments, the shape fitting component 250 fits shapes (e.g., polynomials or Bezier splines for single-dimensional landmarks such as lane lines or poles in perspective view, circles for circular landmarks such as poles or traffic lights in top-down view) to the connected components in a given binary mask. Connected components that are less than some threshold area (e.g., 25 pixels) may be omitted from shape fitting. In some embodiments, for each connected component (e.g., above a threshold area), the shape fitting component 250 may fit a shape to the connected component by sampling the connected component's centroid pixel and/or N (e.g., random) pixels (e.g., 10 pixels for a 1024×786 resolution image), and applying shape fitting to those sampled pixels. By way of non-limiting example, in some embodiments that involve polynomial fitting (e.g., to lane lines), any suitable polynomial fitting technique may be applied (e.g., least squares).

In some embodiments, the merging component 260 merges (or combines) connected components based on their fitted shapes and/or their areas. For example, for each fitted shape (e.g., polynomial), the fitted shape may be weighted based on the number and/or the area of the connected components it intersects. In some embodiments, to determine whether a fitted shape intersects a particular connected component, the merging component 260 samples the centroid pixel and/or N (e.g., random) pixels, and evaluates whether each sampled pixel falls within a threshold distance of the fitted shape. As such, for each fitted shape (e.g., fitted to a first connected component) that intersects a second connected component and has a higher weight than all the other fitted shapes that intersect that second connected component, the merging component 260 may absorb that second connected component into the first connected component (used to generated the higher weighted fitted shape). The merging component 260 may use any technique to test combinations of connected component for merging (e.g., evaluating each fitted shape independently, evaluating scenarios in which multiple fitted shapes intersect multiple connected components, testing every combination, etc.). In some embodiments, if the merging component 260 determines to merge some number of connected components (e.g., at least one merge), upon completion of the merging process, the iteration controller 270 may calculate new centroids for the merged connected components and iterate again (e.g., until the merging component 260 determines not to merge any connected components during a particular iteration).

Figure 3A:
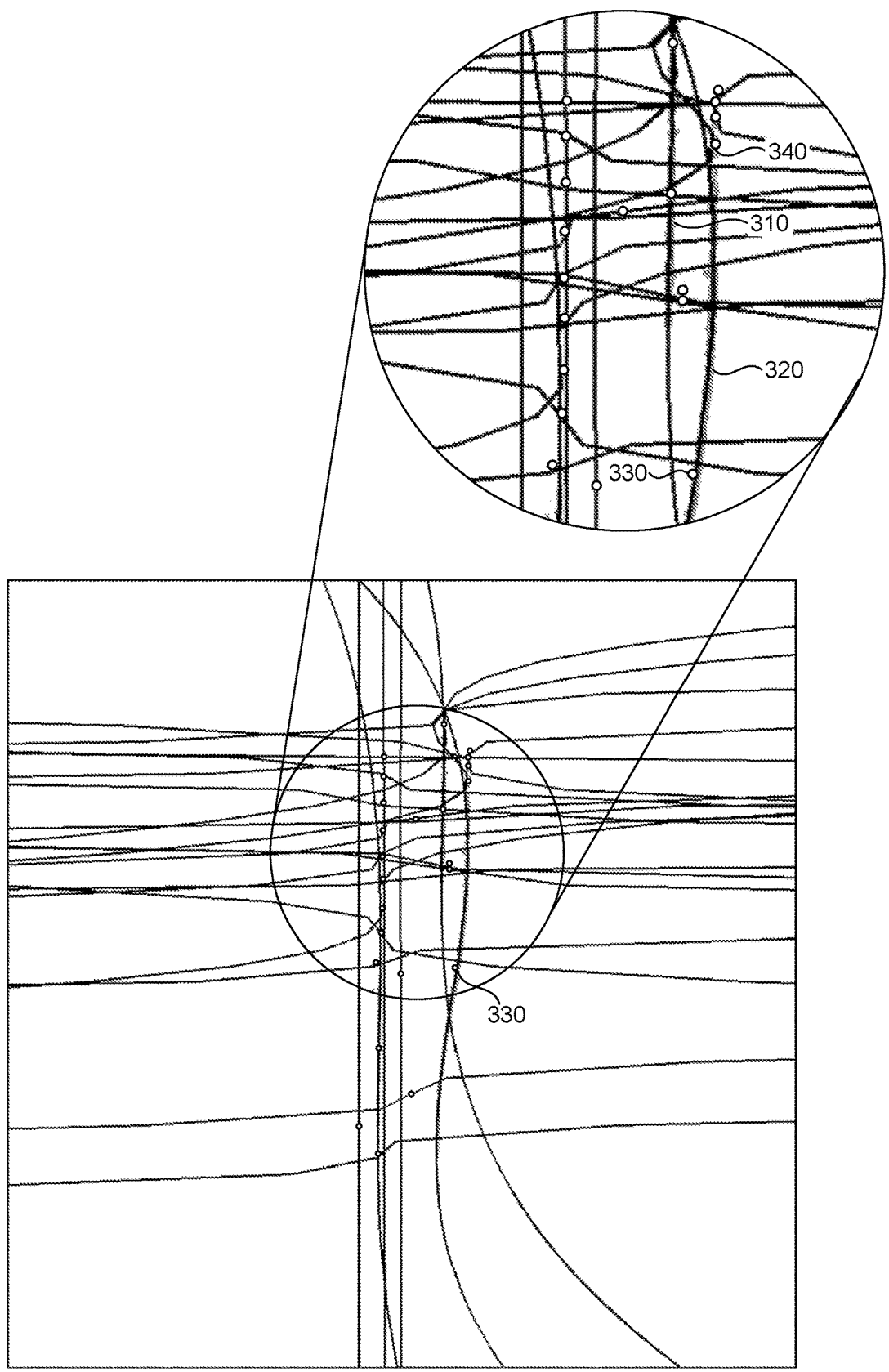
FIGS. 3A-3C are illustrations of successive iterations that merge connected components, in accordance with some embodiments of the present disclosure.
Figure 3B:
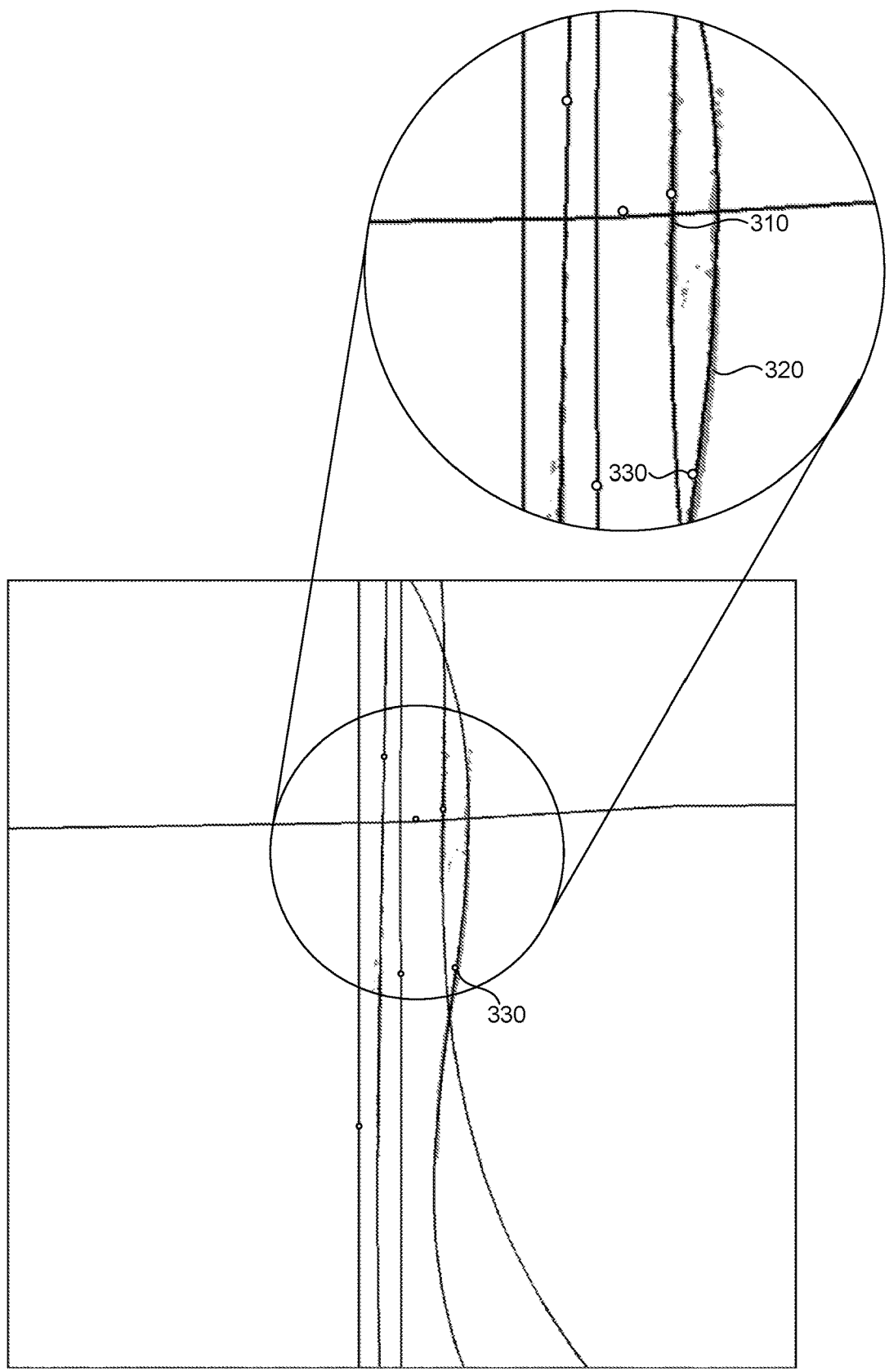
Figure 3C:
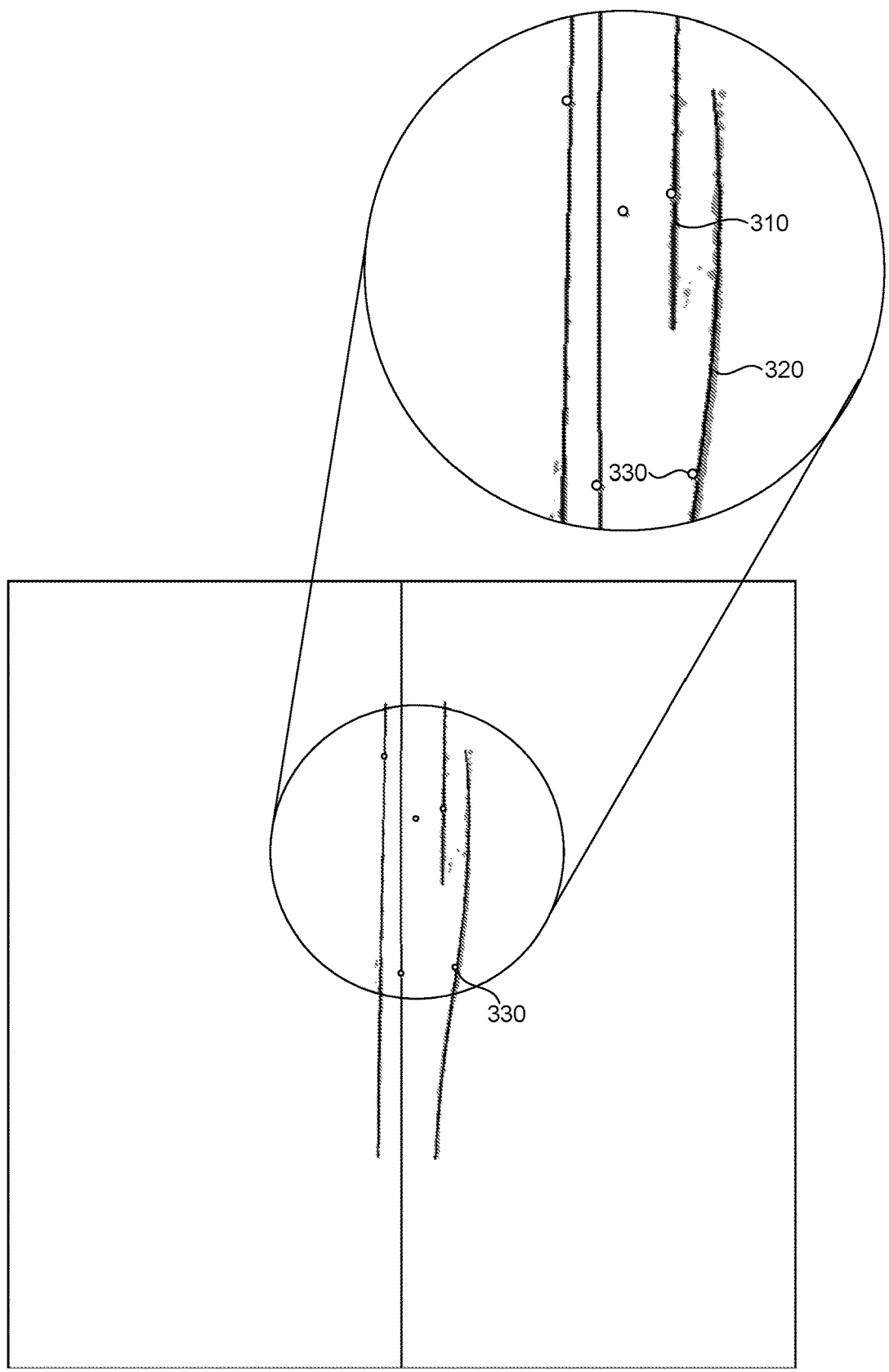

As such, the shape regression module 220 may output one or more connected components (groups of pixels of determined to be part of a particular instance of the same class) and a corresponding fitted shape for each connected component (e.g., a fitted polyline for each detected lane line). FIGS. 3A-3C are illustrations of successive iterations that merge connected components, in accordance with some embodiments of the present disclosure. Each of FIGS. 3A-3C represents an example of a possible binary mask (e.g., representing a top-down projected classification image for lane lines) after a successive iteration of polynomial fitting and merging of connected components. FIG. 3A illustrates polynomials (e.g., appearing in FIG. 3A as solid lines) that were fitted to connected components (e.g., illustrated as shaded regions, such as regions 310, 320, 340), and also illustrates connected component centroids (e.g., illustrated as dots, such as centroid 330 of region 320). FIG. 3B illustrates the resulting connected components and centroids after a merging operation. For example, notice how many of the polynomials (represented as lines) in FIG. 3A were absorbed into a much smaller set of polynomials in FIG. 3B, resulting in fewer connected components and corresponding centroids (represented as dots). Similarly, FIG. 3C illustrates the resulting connected components and centroids after a merging operation in a subsequent iteration. Notice again how some of the polynomials (represented as lines) in FIG. 3B were absorbed into a smaller set of polynomials in FIG. 3C, again resulting in fewer connected components and corresponding centroids (represented as dots). Also notice how originally in FIG. 3A, the centroid 330 of region 320 was lower than its position in FIG. 3B, after the region 320 absorbed the connected components that were above it in FIG. 3A. As such, the connected components remaining after one or more iterations of merging may be used to represent detected lane lines, and their corresponding fitted polynomials may be used as a representation of their shape.

Turning now to FIG. 4, FIG. 4 is a data flow diagram illustrating an example process 400 for landmark detection and shape regression using one or more machine learning models, in accordance with some embodiments of the present disclosure. In some embodiments, the process 400 represents a possible way for the landmark detection and shape regression component 108 of FIG. 1 to detect landmarks (or other objects) and/or regress their shapes using the input data 106.

At a high level, FIG. 4 depicts one or more machine learning models 408 that extract class confidence data 410 and shape regression data 412 from the input data 106 (e.g., a projected 2D representation of measured 3D points having any number of channels representing any characteristic of the sensor data 102, such as projected position of a measured 3D point, one or more reflection characteristics, image data such as pixel color, etc.). In some embodiments, the machine learning model(s) 408 jointly predicts class confidence data 410 and shape regression data 412 using different output heads (as illustrated in FIG. 5). In some embodiments, the machine learning model(s) 408 includes one or more machine learning models 208 that extract class confidence data 210 from the input data 106, followed by one or more machine learning models 914 that extract shape regression data 412 from a representation of the class confidence data 210 (as illustrated in FIG. 9). As such, a shape decoder 414 may process the extracted class confidence data 410 and/or shape regression data 412 to generate a representation of detected landmark(s) 115 (e.g., for each fitted shape represented by shape regression data 412, a representation of the location, geometry, and/or orientation of the landmark represented by the fitted shape, a class label, etc.).

More specifically, FIG. 5 illustrates a data flow diagram illustrating an example process 500 for jointly predicting classifications and regressing shape using one or more machine learning models 408, in accordance with some embodiments of the present disclosure. In some embodiments, the process 500 represents a possible way for the landmark detection and shape regression component 108 of FIG. 1 and/or the machine learning model(s) 408 of FIG. 4 to detect landmarks (or other objects) and/or regress their shapes using the input data 106.

In some embodiments, the machine learning model(s) 408 (and/or other machine learning model(s) described herein) may be implemented using a DNN, such as a convolutional neural network (CNN) and/or a transformer neural network. Although certain embodiments are described with the machine learning model(s) 408 being implemented using a neural network(s), this is not intended to be limiting. For example, and without limitation, the machine learning model(s) 408 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., transformer, auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In some embodiments, the machine learning model(s) 408 may include a common trunk (or stream of layers) with one or more input heads (or at least partially discrete streams of layers) for processing different inputs and/or one or more output heads (or at least partially discrete streams of layers) for predicting different outputs based on the input data 406. For example, the machine learning model(s) 408 may include, without limitation, one or more feature extractors (e.g., a DNN, one or more encoders, one or more decoders, etc.) including convolutional layers, transformer layers, pooling layers, and/or other layer types. In some embodiments, multiple inputs (e.g., single or multi-channel images or tensor) may be generated with different views (e.g., first and second views 510 and 520), each image may be fed into separate side-by-size feature extractors (e.g., first and second encoder heads 530 and 540), and the latent space images/tensors output by the separate feature extractors may be combined (e.g., by a fusion component 560). In some embodiments, an output of a particular feature extractor (e.g., an encoder/decoder trunk 570) may be provided as input to a first output head (e.g., a class confidence head 580) for predicting classification data (e.g., confidence data 410) and a second output head (e.g., a shape regression head 590) for regressing a representation of shape (e.g., shape regression data 412). As such, some such embodiments, the first and second output heads may receive parallel inputs, and thus may produce different outputs from similar input data.

In the embodiment illustrated in FIG. 5, the input data 106 includes (e.g., in corresponding channels), or may be used to generate, a first projected 2D representation of measured 3D points from a first view 510 of the 3D environment, and a second projected 2D representation of measured 3D points from a second view 520 of the environment, and the machine learning model(s) 408 includes different input heads to process the different views (e.g., the first a second encoder heads 530 and 540, respectively). For example, the first view 510 may be a top-down view, and the second view 520 may be a perspective view. In some multi-view embodiments, extracted features generated by one of the inputs heads are projected into the other view and fused with the extracted features generated by the other input head. For example, in FIG. 5, the second encoder head 540 may extract features in the second view 520. In some embodiments, there may be a pixel correspondence between the second view 520 and the extracted features generated by the second encoder head 540. As such, in some embodiments in which the input data 106 and therefore the second view 520 include a projected representation of measured 3D points (e.g., LiDAR points), the known 3D locations of the measured 3D points represented by each pixel of the second view 520 may be associated with corresponding pixels of the extracted features generated by the second encoder head 540. Accordingly, the projection component 550 may project the extracted features from the second view 520 to form a projected representation in the first view, and the fusion component 560 may combine the extracted features generated by the first encoder head 530 in the first view 510 with the projected representation of the extracted features generated by the second encoder head 540 (e.g., by concatenating, stacking layers, element-wise summation, etc.).

In some embodiments, the machine learning model(s) 408 includes an encoder/decoder trunk 570 (e.g., implemented using a transformer architecture) with two output heads, a class confidence head 580 and a shape regression head 590, which may classify and regress (respectively) in any view. For example, the class confidence head 580 may predict the class confidence data 410 (e.g., 2D or 3D confidence maps for any number of classes, in any number of channels, in any suitable view), and the shape regression head 590 may predict the shape regression data 412 (e.g., a regressed representation of one or more fitted 2D or 3D shapes of detected landmarks represented in the input data 106 and/or the class confidence data 410). For example, the class confidence data 410 may comprise one or more channels that represent confidence maps for different classes (e.g. lane lines, poles, background, etc.), and the shape regression data 412 may comprise one or more channels that represent regressed parameters of a regressed 2D or 3D shape associated with each pixel. Example regressed parameters include control points for a fitted Bezier spline, polynomial coefficients for a fitted polynomial, a representation of radius for a fitted circle, and/or others.

Figure 6:
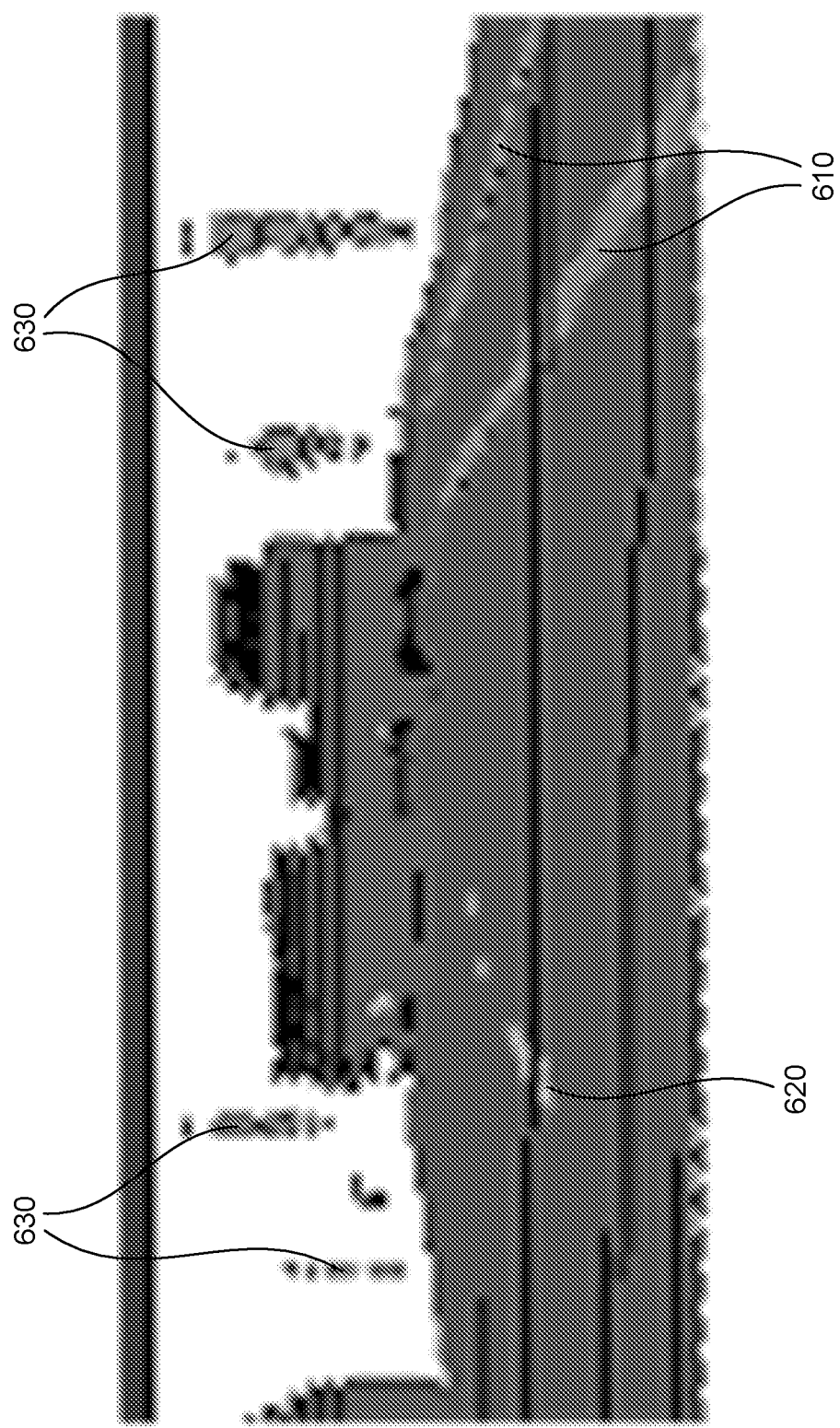
FIG. 6 is an illustration of example class confidence data that may be predicted in perspective view by one or more machine learning models, in accordance with some embodiments of the present disclosure.
Figure 7:
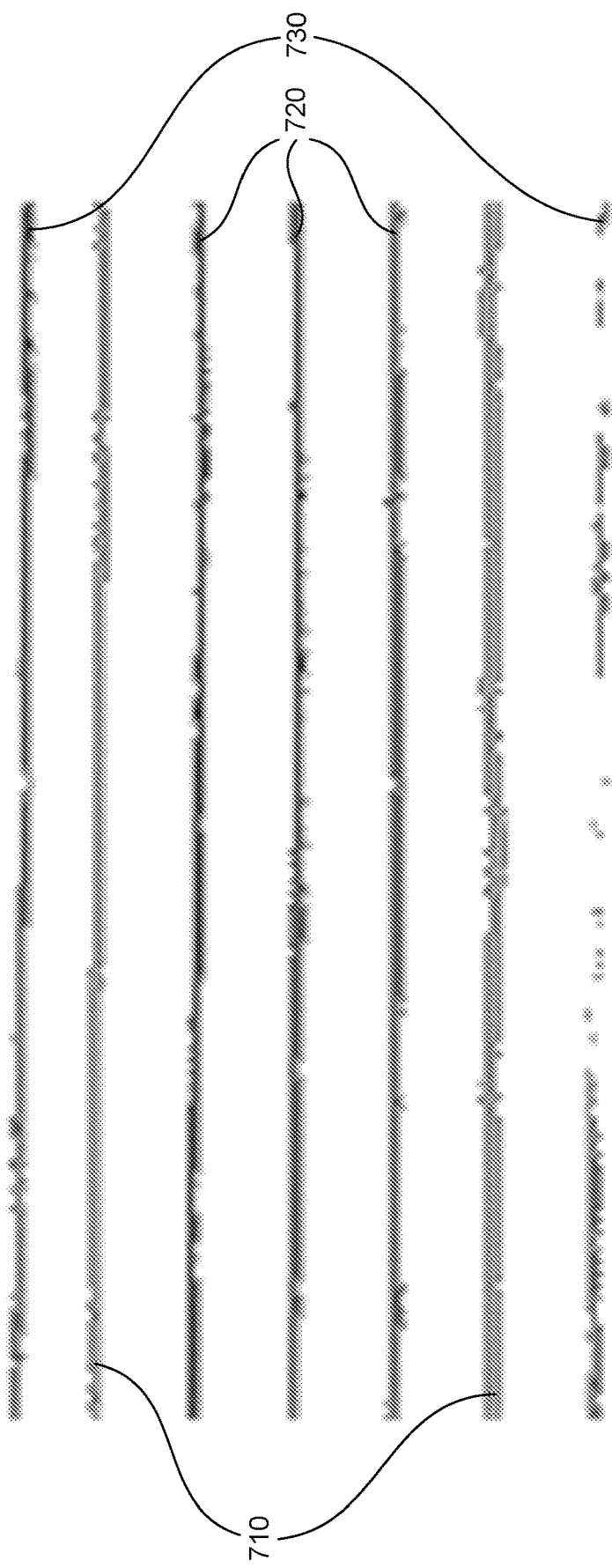
FIG. 7 is an illustration of example class confidence data that may be predicted in top-down view by one or more machine learning models, in accordance with some embodiments of the present disclosure.

The class confidence head 580 may include any number of layers (e.g., transformer, convolution, pooling, classifier such as softmax, and/or other types of operations, etc.) that predict the class confidence data 410 from the output of the encoder/decoder trunk 570. For example, the class confidence head 580 may include a channel (e.g., a stream of layers plus a classifier) for each class of street furniture, landmark, and/or other object to be detected (e.g., traffic lights, traffic signs, lane lines, road boundaries, poles, streetlamps, benches, traffic barriers, bollards, post boxes, phone boxes, bus stops, tram stops, taxi stands, fountains, watering troughs, memorials, public sculptures, waste receptacles, background, etc.), such that the class confidence head 580 extracts classification data (e.g., class confidence data 410) in any suitable form. For example, the class confidence head 580 may predict a confidence map that represents an inferred confidence level of whether a particular landmark is present (regardless of class), separate confidence maps for each class, and/or the like. In some embodiments, the class confidence data 410 predicted by the class confidence head 580 may take the form of a multi-channel tensor where each channel may be thought of as a heat map storing classification values (e.g., probability, score, or logit) that each pixel belongs to the class corresponding to the channel. FIG. 6 is an illustration of example class confidence data that may be predicted in perspective view by the machine learning model(s) 408 (e.g., with confidence maps for solid lane lines, dashed lane lines, and poles thresholded, combined into a single segmentation mask for illustration purposes, and illustrated with different greyscales 610, 620, and 630, respectively). FIG. 7 is an illustration of example class confidence data that may be predicted in top-down view by the machine learning model(s) 408 (e.g., with confidence maps for solid lane lines, dashed lane lines, and road boundaries thresholded, combined into a single segmentation mask for illustration purposes, and illustrated with different greyscales 710, 720, and 730, respectively).

Returning to FIG. 5, the shape regression head 590 may include any number of layers (e.g., transformer, convolution, pooling, classifier such as softmax, and/or other types of operations, etc.) that predict the shape regression data 412 (e.g., a representation of location, geometry, and/or orientation of shapes or curves fitted to instances of detected landmarks or other objects) from the output of the encoder/decoder trunk 570. The shape regression head 590 may include N channels (e.g., streams of layers plus a classifier), where each channel regresses a value for a different parameter of a designated parametrization (e.g., coordinates of control points for a fitted Bezier spline, polynomial coefficients for a fitted polynomial, a representation of radius for a fitted circle, and/or others). Taking a polynomial parameterization as an example, the shape regression data 412 may include N channels that include floating-point numbers that regress, for each pixel, polynomial coefficients for a candidate polynomial associated with a candidate anchor point represented by the pixel. The shape regression head 590 may include separate regression channels for each class, or one set of channels for all classes. As such, the shape regression data 412 may include, for each pixel, one or more dimensions of regressed values (e.g., a depth-wise vector) that represent a parameterization of a fitted 2D or 3D shape associated with each pixel. As explained in more detail below, the class confidence data 410 may be decoded (e.g., thresholded) to identify one or more pixels (which may be understood as predicted anchor points for corresponding fitted shapes), and the parameterization predicted for each corresponding pixel in the shape regression data 412 (e.g., the depth-wise vector for each predicted anchor point) may be used to parameterize a corresponding fitted 2D or 3D shape. As such, in some embodiments, a predicted anchor point may contribute to a parameterization or position of a fitted shape, even though it may not be used directly as a control point for the fitted shape.

Figure 8:
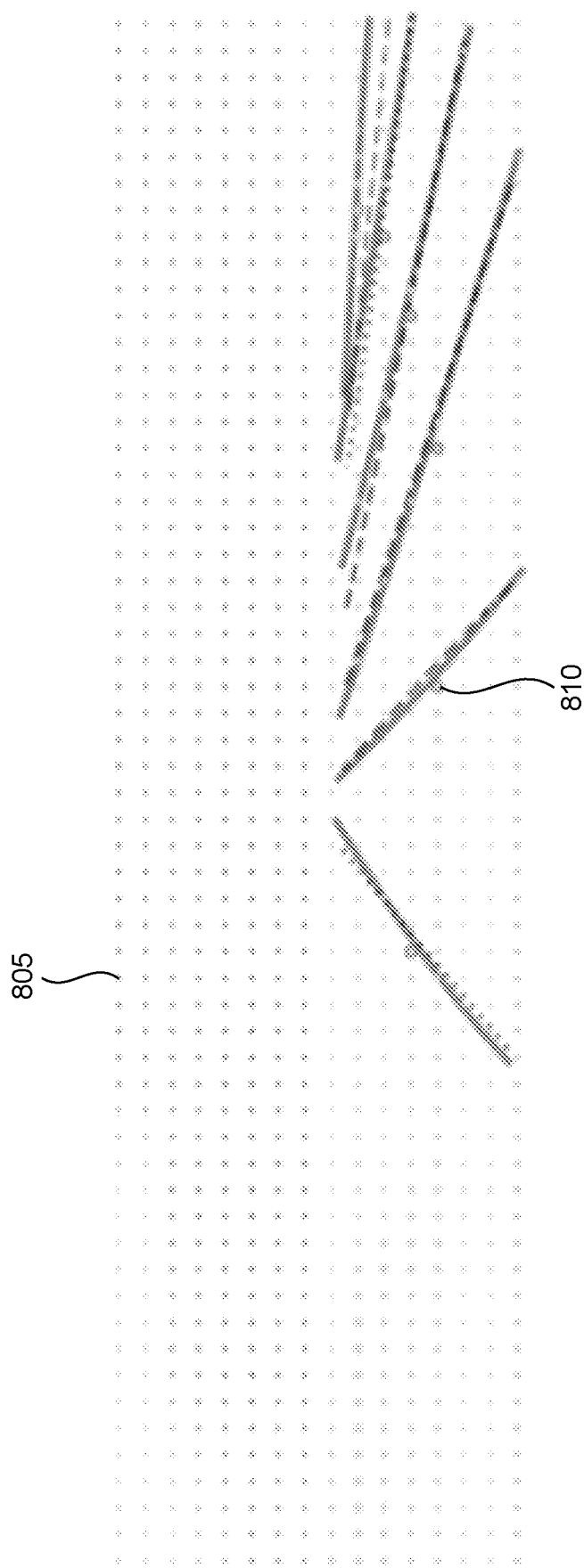
FIG. 8 is an illustration of example shape regression data that may be predicted by one or more machine learning models, in accordance with some embodiments of the present disclosure.

For example and by way of illustration, if the goal is to regress 2D/3D polylines fitted to classes of landmarks such as lane lines, road boundaries, and/or poles in perspective view, the 2D/3D polylines may be parameterized into Bezier splines and/or n-degree polynomials. FIG. 8 is an illustration of example shape regression data that may be predicted by one or more machine learning models, in accordance with some embodiments of the present disclosure. FIG. 8 illustrates a grid where each cell in the grid (e.g., cell 805) is illustrated as a dot and represents a candidate anchor point for regressed polylines in perspective view, dotted lines represent ground truth lane lines, the enlarged dots (e.g., point 810) represent predicted anchor points with predicted confidence levels above a threshold, and solid lines represent predicted polylines parametrized by predicted parameters associated with the predicted anchor points. In some embodiments, classification need not be on a per-LiDAR point basis. For example, pixels and/or anchor points (e.g., and therefore, the class confidence data 410 and/or the shape regression data 412) may be predicted at some lower resolution (e.g., 400×200 cells).

As such, and returning to FIG. 4, the machine learning model(s) 408 may predict the class confidence data 410 and the shape regression data 412, which the shape decoder 414 may decode in any suitable manner. For example, the shape decoder 414 may apply thresholding to a predicted confidence map (e.g., from one or more channels of the class confidence data 410) generated by the machine learning model(s) 408 to identify a set of anchor points, and may look up corresponding regressed parameters for fitted shapes (e.g., from corresponding pixels of one or more regression channels of the shape regression data 412). In some embodiments, the shape decoder 414 applies thresholding to each channel of the class confidence data 410 to identify zero or more anchor points for each class. The shape decoder 414 may exclude anchor points for a particular class when the same anchor point (e.g., pixel) was predicted to have a higher likelihood of being a different class (e.g., exclude anchor points corresponding to pixels for which the class with the highest predicted likelihood is background). As such, the shape decoder 414 may identify zero or more anchor points for each class (e.g., for each channel of the class confidence data 410). In some embodiments, end-to-end one stage detection and/or a combination of classification and location costs may be used to suppress the machine learning model(s) 408 from predicting multiple anchor points (e.g., pixels) for the same object instance (e.g., the same lane, pole, etc.). As such, each predicted anchor point may be used to represent a corresponding fitted 2D or 3D shape. For each anchor point, the shape decoder 414 may retrieve and/or generate a representation of the regression values predicted for a corresponding pixel in the shape regression data 412 (e.g., for N anchor points, retrieve N depth-wise vectors). As such, the shape decoder 414 may decode the class confidence data 410 and the shape regression data 412 to identify a representation of a detected landmark(s) 115 (e.g., instances of detected landmarks, corresponding fitted shapes, a projected or encoded representation thereof).

FIG. 9 is a data flow diagram illustrating an example process 900 for sequentially predicting classifications and regressing on a shape using one or more machine learning models, in accordance with some embodiments of the present disclosure. In some embodiments, the process 900 represents a possible way for the landmark detection and shape regression component 108 of FIG. 1 and/or the machine learning model(s) 408 of FIG. 4 to detect landmarks (or other objects) and/or regress their shapes using the input data 106. More specifically, while FIG. 5 illustrates an embodiment in which the machine learning model(s) 408 jointly predicts classifications and regresses shape, FIG. 9 illustrates an implementation in which classifications are available (e.g., the class confidence data 210 generated by the machine learning model(s) 208), so the machine learning model(s) 914 predicts shape regression data 412 based on a representation of the class confidence data 210 (e.g., the input data 218 generated by the input generator 212 using the class confidence data 210, with any number of channels representing other characteristics of corresponding measured 3D points). In some such embodiments, the classification DNN or stage (e.g., the machine learning model(s) 208) may operate similarly as the class confidence head 580 of FIG. 5, and the regression DNN or stage (e.g., the machine learning model(s) 914) may operate similarly as the shape regression head 590 of FIG. 5, except the two DNNs (or stages) are serialized rather than output from the same encoder/decoder trunk (as in FIG. 5).

In some embodiments, the class confidence data 210 extracted by the machine learning model(s) 208 is fed into the machine learning model(s) 914. In some embodiments, the input generator 212 may accumulate and/or ego-motion compensate classified measured 3D points, apply thresholding (e.g., for the class represented in each channel) to generate a binary mask, may apply dilation to generate a densified representation, may stack the resulting images/masks/tensors, and/or may feed the resulting (e.g., dilated, binary) representation into the machine learning model(s) 914 to extract the shape regression data 412.

Regardless of the implementation, input training data for the machine learning model(s) 408 (e.g., input data 406) may be generated from sensor data using the techniques for operating the machine learning model(s) 408 described herein. For example, a scene may be observed with one or more sensors (e.g., one or more LiDAR sensor(s), camera(s), etc.), and a projected representation of the sensor data (e.g., a projection image) may be generated with the same size and dimensionality as the input data 406 and used as input training data.

To generate ground truth data, the projected representation of the sensor data may be annotated with 2D or 3D polylines and corresponding class labels. Annotations may be generated manually and/or automatically, and used to derive corresponding ground truth outputs for the machine learning model(s) 408 (e.g., class confidence data 410 such as confidence maps or segmentation masks, shape regression data 412, etc.).

For example, to generate ground truth shape regression data, taking Bezier splines as an example, and given a dataset of ground truth 3D polylines, each ground truth 3D polyline may be fitted a ground truth Bezier spline with a designated number of ground truth control points and parametrized with a vector a $\in R^m$ (e.g., representing the positions and/or coordinates of the ground truth control points), and/or each ground truth 3D polyline may be (e.g., densely) sampled in 3D to generate a set of (e.g., equidistant and ordered) ground truth vertices $X \in R^{N \times 3}$. Ground truth anchor (grid) points may be defined with respect to a grid of any suitable size, spatial resolution (e.g., cell/ground sampling size) and/or representing any suitable view. For example, FIG. 8 illustrates a grid where each cell in the grid (illustrated as a dot) represents a candidate anchor point in a perspective view. For each ground truth 3D polyline, a representative point of the ground truth 3D polyline (e.g., the center or middle vertex in X) may be identified and assigned to the closet grid cell (candidate anchor point) $Z \in R^2$ in the grid. A ground truth class confidence map may be generated using one value (e.g., 1) to represent cells that have been assigned a ground truth anchor point and another value (e.g., 0) to represent cells that have not. For each pixel that was assigned a ground truth anchor point, the associated pixels in the regression channels (which may be understood as a vector of depth-wise pixel values) may be populated with a corresponding ground truth parameterization of the ground truth control points (and the other pixels in the regression channels may be populated with zeros). Taking a 3-degree Bezier spline with four control points and 2D regression as an example, each control point may be parameterized with two dimensions (e.g., x, y), each of which may be assigned and encoded into to one or more corresponding regression channels. As such, ground truth shape regression data may be generated with the same size and/or and dimensionality as the shape regression data 412 of FIG. 4.

To generate ground truth classification data, known and/or labeled class(es) of the ground truth 3D polylines may be used to generate one or more ground truth confidence maps with the same size and dimensionality as the class confidence data 410 of FIG. 4 (e.g., assigning a value such as 1 to represent pixels that belong to a class represented by a channel, and assigning another value such as 0 elsewhere).

As such, annotations may be used to generate ground truth class confidence and/or shape regression data, which may be used with corresponding input training data (e.g., input images, input tensors) as part of a training dataset to train the machine learning model(s) 408. For example, one or more loss functions (e.g., a single loss function, a loss function for each output type, etc.) may be used to compare the accuracy of the output(s) of machine learning model(s) 408 to ground truth, and the parameters of the machine learning model(s) 408 may be updated (e.g., using backward passes, backpropagation, forward passes, etc.) until the accuracy reaches an optimal or acceptable level. In some embodiments in which machine learning model(s) 408 includes multiple heads, the multiple heads may be co-trained together with a common trunk, or may be trained separately. In embodiments involving multi-view scenarios with separate DNN feature extractors, the DNN feature extractors may be co-trained together or separately. These and other variations are contemplated within the present disclosure.

In embodiments in which the machine learning model(s) 408 includes a chain of multiple stages or views, the different stages or views may be trained together or separately. In some embodiments, the stages or views may be trained together by implementing a transformation from the output of a first stage or view to the input to a second stage or view) (e.g., the projection component 550 of FIG. 5) using a differentiable operation (e.g., a differentiable re-projection). For example, corresponding training input data may be input into the first and second encoder heads 530 and 540, respectively, the output of the second encoder head 540 may be transformed using a differentiable transformation by projection component 550 and fused with the output of the first encoder head 530 by the fusion component 560, and fed into a subsequent stage of the machine learning model(s) 408 (e.g., the encoder/decoder trunk 570).

In some embodiments, a classification loss function such as multi-class cross-entropy loss may be used for classification tasks. The multi-class cross-entropy loss may include a pixel-wise cross-entropy loss summed over all classes. For example, classification loss may be given by $H(p, y) = -\Sigma_i y_i \log(p_i)$, where y is ground truth data (e.g., 1 where a pixel is in the class, 0 otherwise), p is a predicted depth-wise pixel vector with each dimension corresponding to a particular class, p is the predicted classification data per pixel (e.g., probability, score, or logit that the pixel is in a given class i), and the summation may be performed per pixel over all classes (e.g., over all depth channels). Classification loss for a full frame may be computed by computing classification loss for each pixel and taking its mean value.

In some embodiments, a regression loss function such as L1 or L2 loss may be used for regression tasks. For example, regression loss may be determined based on the difference between predicted and ground truth control points, based on the difference between sampled points on predicted and ground truth shapes (e.g., 100 densely sampled points), and/or otherwise. In some embodiments, regression loss (e.g., for the regression channels of the shape regression head 590) may be given by $R(v, t) = |v - t|$, where v is a predicted depth-wise pixel vector to regress, t is a target/ground truth depth-wise pixel vector, and per-pixel regression loss may be summed over all depth channels. In some embodiments, regression loss may be used only for those pixels that belong to a corresponding classification mask (e.g., predicted by the class confidence head 580 of FIG. 5, or derived therefrom). Thus, for each pixel (in the mask), regression loss may be summed over each depth channel, and the mean may be computed over all object pixels, for example, by normalizing (e.g., dividing) by the number of pixels that fall into object masks (e.g., for all classes).

In some embodiments, a total loss may be computed as a sum of classification loss and regression loss. In some embodiments, the contribution to the loss from the different tasks may be weighted with fixed weights and/or auto-weights. Additionally or alternatively, classification loss may be weighted to counteract a class imbalance present in a training dataset. These and other variations may be implemented within the scope of the present disclosure.

As such and returning to FIG. 1, the landmark detection and shape regression component 108 may identify detected landmark(s) 115 (e.g., detected instances of landmarks, corresponding fitted shapes, corresponding class labels). In some embodiments, positional values that are not already in 3D world coordinates may be converted to 3D world coordinates, and/or may be provided for use by the vehicle 1200 of FIGS. 12A-12D in performing one or more operations, such as localization, navigation, and/or others. For example, a representation of the detected landmark(s) 115 (e.g., a 3D point cloud, a 2D representation such as a projection image, corresponding labels) may be used by control component(s) of the vehicle 1200, such as an autonomous driving software stack 122 executing on one or more components of the vehicle 1200 of FIGS. 12A-12D (e.g., the SoC(s) 1204, the CPU(s) 1218, the GPU(s) 1220, etc.). For example, the vehicle 1200 may use this information (e.g., instances of obstacles) to localize its position in a map, to navigate, plan, or otherwise perform one or more operations (e.g., obstacle or protuberance avoidance, lane keeping, lane changing, merging, splitting, adapting a suspension system of the ego-machine to match the current road surface, applying an early acceleration or deceleration based on an approaching surface slope, mapping, etc.) within the environment.

In some embodiments, the detected landmark(s) 115 may be used by one or more layers of the autonomous driving software stack 122 (alternatively referred to herein as "drive stack 122"). The drive stack 122 may include a sensor manager (not shown), perception component(s) (e.g., corresponding to a perception layer of the drive stack 122), a world model manager 126, planning component(s) 128 (e.g., corresponding to a planning layer of the drive stack 122), control component(s) 130 (e.g., corresponding to a control layer of the drive stack 122), obstacle avoidance component(s) 132 (e.g., corresponding to an obstacle, or collision avoidance layer of the drive stack 122), actuation component(s) 134 (e.g., corresponding to an actuation layer of the drive stack 122), and/or other components corresponding to additional and/or alternative layers of the drive stack 122. The process 100 may, in some examples, be executed at least in part by the perception component(s), which may feed up the layers of the drive stack 122 to the world model manager, as described in more detail herein.

The sensor manager may manage and/or abstract sensor data from the sensors of the vehicle 1200. For example, and with reference to FIG. 12C, the sensor data may be generated (e.g., perpetually, at intervals, based on certain conditions) by the LIDAR sensor(s) 1264, the RADAR sensor(s) 1260, the ultrasonic sensor(s) 1262, the stereo camera(s) 1268, other camera(s), and/or other sensors). The sensor manager may receive the sensor data from the sensors in different formats (e.g., sensors of the same type may output sensor data in different formats), and may be configured to convert the different formats to a uniform format (e.g., for each sensor of the same type). As a result, other components, features, and/or functionality of the autonomous vehicle 1200 may use the uniform format, thereby simplifying processing of the sensor data. In some examples, the sensor manager may use a uniform format to apply control back to the sensors of the vehicle 1200, such as to set frame rates or to perform gain control. The sensor manager may also update sensor packets or communications corresponding to the sensor data with timestamps to help inform processing of the sensor data by various components, features, and functionality of an autonomous vehicle control system.

A world model manager 126 may be used to generate, update, and/or define a world model. The world model manager 126 may use information generated by and received from the perception component(s) of the drive stack 122 (e.g., the locations of detected obstacles). The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 126 may continually update the world model based on newly generated and/or received inputs (e.g., data) from the obstacle perceiver, the path perceiver, the wait perceiver, the map perceiver, and/or other components of the autonomous vehicle control system.

The world model may be used to help inform planning component(s) 128, control component(s) 130, obstacle avoidance component(s) 132, and/or actuation component(s) 134 of the drive stack 122. The obstacle perceiver may perform obstacle perception that may be based on where the vehicle 1200 is allowed to drive or is capable of driving (e.g., based on the location of the drivable or other navigable paths defined by avoiding detected obstacles in the environment and/or detected protuberances in the road surface), and how fast the vehicle 1200 can drive without colliding with an obstacle (e.g., an object, such as a structure, entity, vehicle, etc.) that is sensed by the sensors of the vehicle 1200.

The path perceiver may perform path perception, such as by perceiving nominal paths that are available in a particular situation. In some examples, the path perceiver may further take into account lane changes for path perception. A lane graph may represent the path or paths available to the vehicle 1200, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information. In some embodiments, the path perceiver may take into account the detected landmark(s) 115. For example, the path perceiver may evaluate a reconstructed 3D road surface to identify protuberances and include paths that avoid the protuberances.

The wait perceiver may be responsible to determining constraints on the vehicle 1200 as a result of rules, conventions, and/or practical considerations. For example, the rules, conventions, and/or practical considerations may be in relation to a 3D road surface, traffic lights, multi-way stops, yields, merges, toll booths, gates, police or other emergency personnel, road workers, stopped buses or other vehicles, one-way bridge arbitrations, ferry entrances, etc. Thus, the wait perceiver may be leveraged to identify potential obstacles and implement one or more controls (e.g., slowing down, coming to a stop, etc.) that may not have been possible relying solely on the obstacle perceiver. In some embodiments, the wait perceiver may take into account the detected landmark(s) 115. For example, the wait perceiver may evaluate a reconstructed 3D road surface to identify an approaching surface slope and determine to apply and/or apply an early acceleration or deceleration to accommodate the approaching surface slope. Additionally or alternatively, the wait perceiver may evaluate a reconstructed 3D road surface to identify a portion of an approaching road surface and determine to adapt and/or adapt a suspension system of the vehicle 1200 such that, once the vehicle 1200 reaches a corresponding portion of the road, the suspension system matches the identified road surface.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 1200 of static or stationary infrastructure objects and obstacles. The map perceiver may also generate information for the wait perceiver and/or the path perceiver, for example, such as to determine which light at an intersection has to be green for the vehicle 1200 to take a particular path.

Figure 12A:
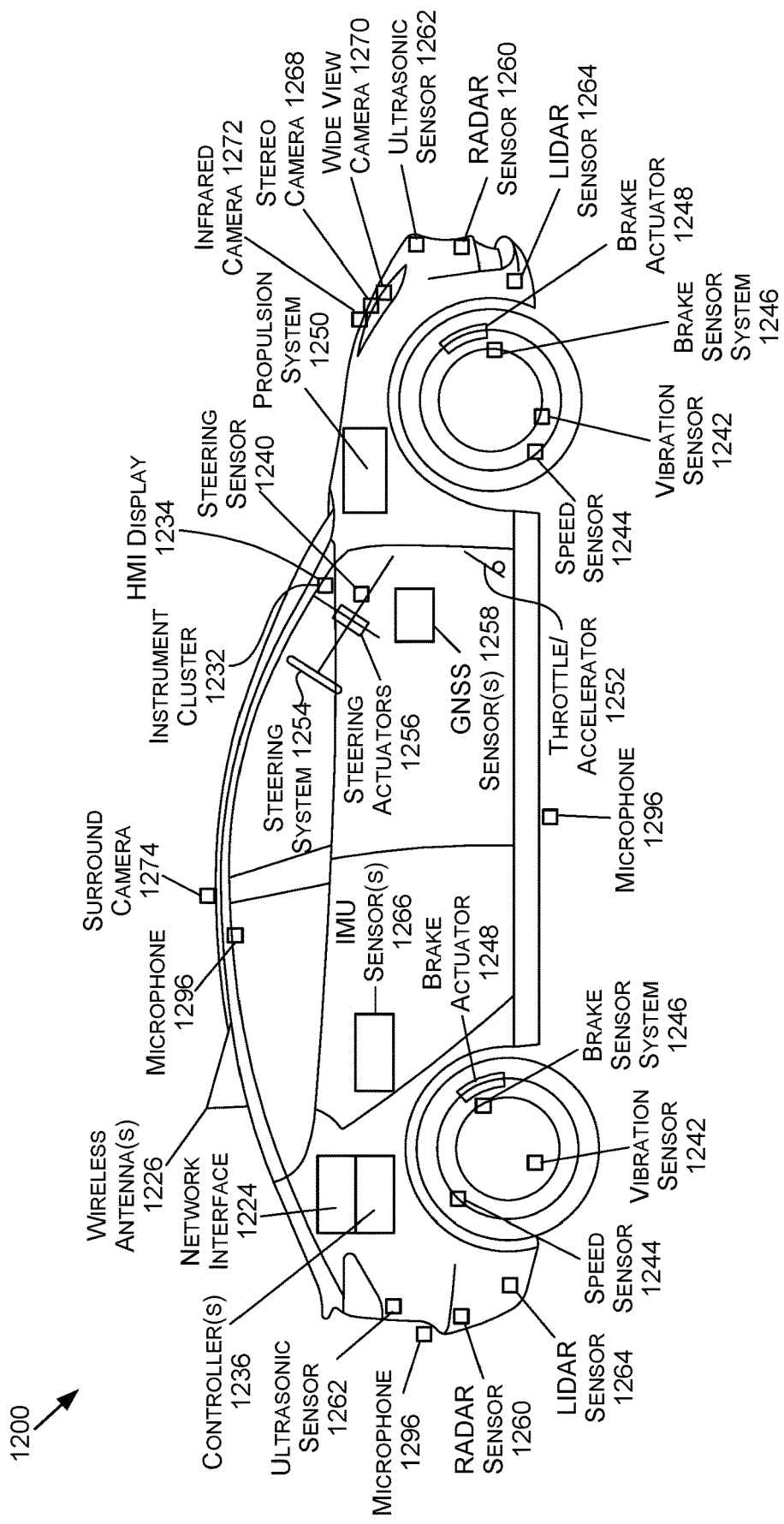
FIG. 12A is an illustration of an example autonomous vehicle, in accordance with some embodiments of the present disclosure.
Figure 12B:
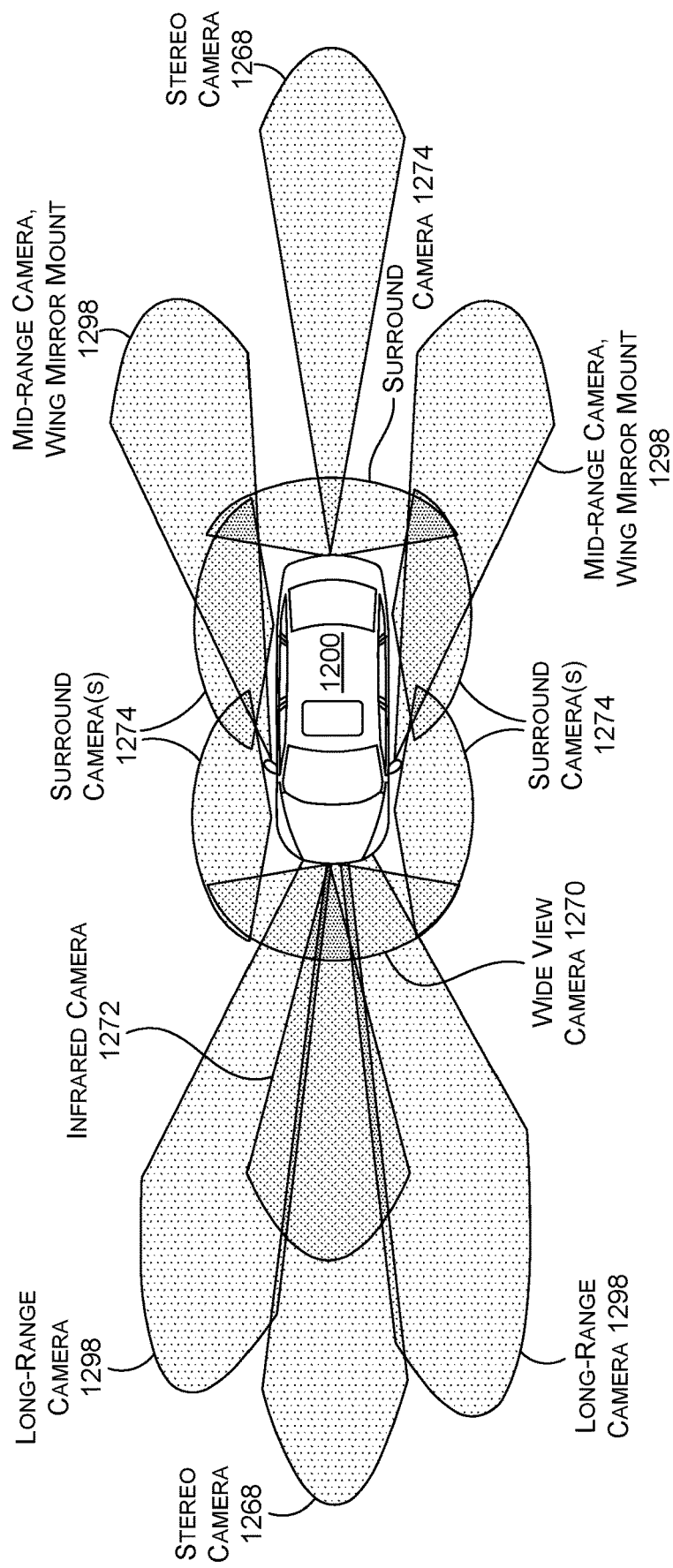
FIG. 12B is an example of camera locations and fields of view for the example autonomous vehicle of FIG. 12A, in accordance with some embodiments of the present disclosure.
Figure 12C:
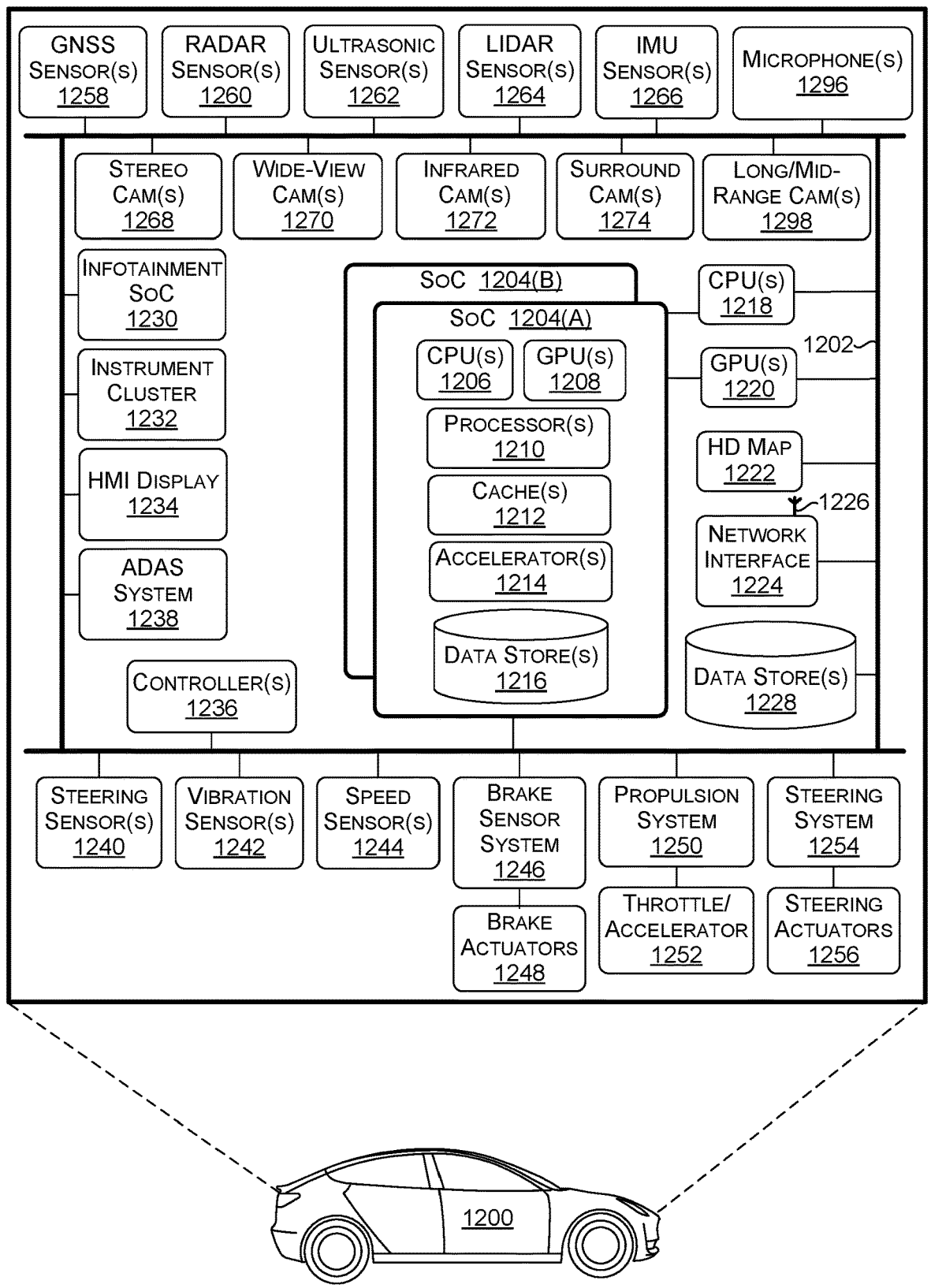
FIG. 12C is a block diagram of an example system architecture for the example autonomous vehicle of FIG. 12A, in accordance with some embodiments of the present disclosure.
Figure 12D:
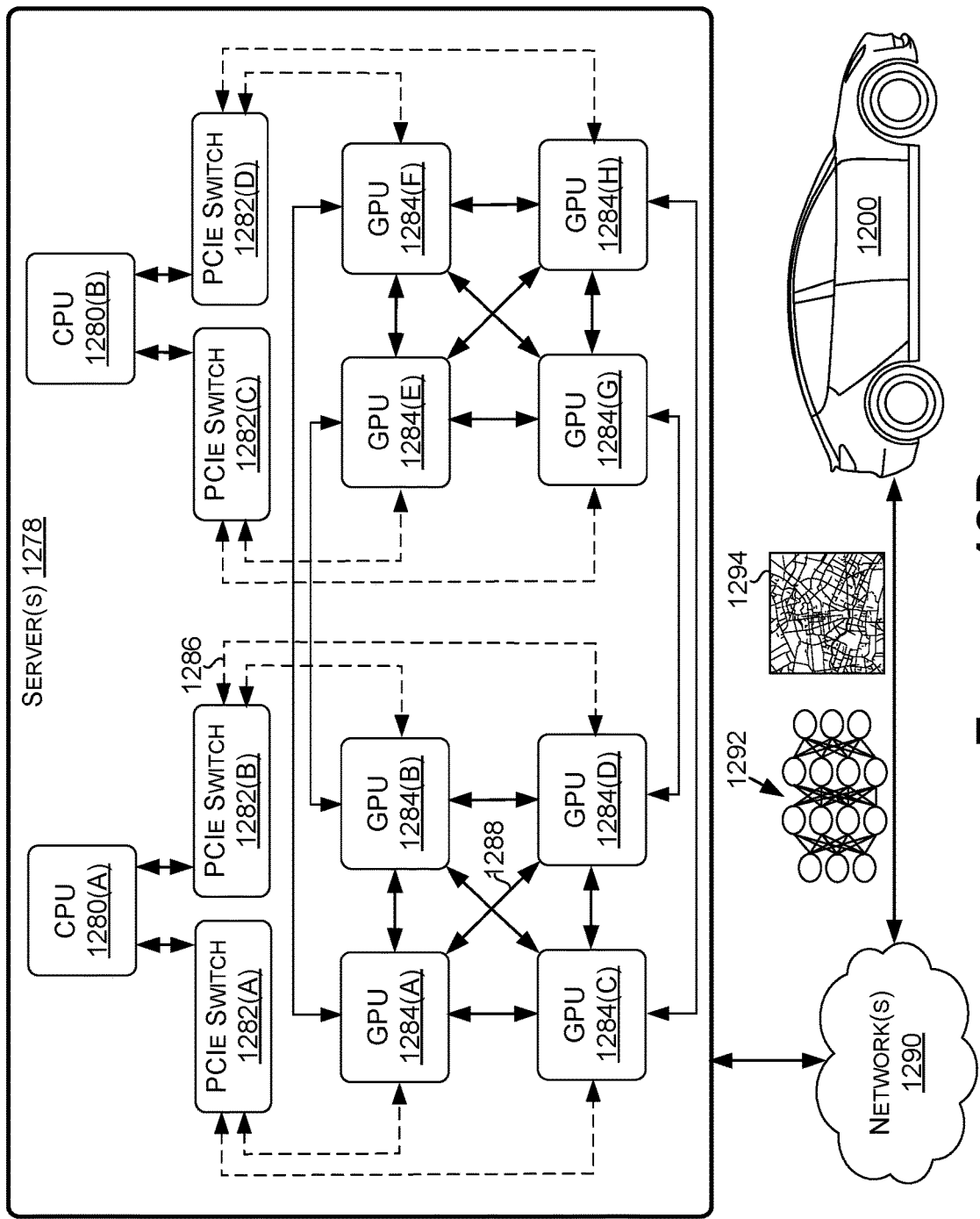
FIG. 12D is a system diagram for communication between cloud-based server(s) and the example autonomous vehicle of FIG. 12A, in accordance with some embodiments of the present disclosure.

In some examples, information from the map perceiver may be sent, transmitted, and/or provided to server(s) (e.g., to a map manager of server(s) 1278 of FIG. 12D), and information from the server(s) may be sent, transmitted, and/or provided to the map perceiver and/or a localization manager of the vehicle 1200. The map manager may include a cloud mapping application that is remotely located from the vehicle 1200 and accessible by the vehicle 1200 over one or more network(s). For example, the map perceiver and/or the localization manager of the vehicle 1200 may communicate with the map manager and/or one or more other components or features of the server(s) to inform the map perceiver and/or the localization manager of past and present drives or trips of the vehicle 1200, as well as past and present drives or trips of other vehicles. The map manager may provide mapping outputs (e.g., map data) that may be localized by the localization manager based on a particular location of the vehicle 1200, and the localized mapping outputs may be used by the world model manager 126 to generate and/or update the world model.

The planning component(s) 128 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints), 3D world coordinates (e.g., Cartesian, polar, etc.) that indicate coordinates relative to an origin point on the vehicle 1200, etc. The waypoints may be representative of a specific distance into the future for the vehicle 1200, such as a number of city blocks, a number of kilometers, a number of feet, a number of inches, a number of miles, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 1200, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 130 may follow a trajectory or path (lateral and longitudinal) that has been received from the behavior selector (e.g., based on the detected landmark(s) 115) of the planning component(s) 128 as closely as possible and within the capabilities of the vehicle 1200. The control component(s) 130 may use tight feedback to handle unplanned events or behaviors that are not modeled and/or anything that causes discrepancies from the ideal (e.g., unexpected delay). In some examples, the control component(s) 130 may use a forward prediction model that takes control as an input variable, and produces predictions that may be compared with the desired state (e.g., compared with the desired lateral and longitudinal path requested by the planning component(s) 128). The control(s) that minimize discrepancy may be determined.

Although the planning component(s) 128 and the control component(s) 130 are illustrated separately, this is not intended to be limiting. For example, in some embodiments, the delineation between the planning component(s) 128 and the control component(s) 130 may not be precisely defined. As such, at least some of the components, features, and/or functionality attributed to the planning component(s) 128 may be associated with the control component(s) 130, and vice versa. This may also hold true for any of the separately illustrated components of the drive stack 122.

The obstacle avoidance component(s) 132 may aid the autonomous vehicle 1200 in avoiding collisions with objects (e.g., moving and stationary objects). The obstacle avoidance component(s) 132 may include a computational mechanism at a "primal level" of obstacle avoidance, and may act as a "survival brain" or "reptile brain" for the vehicle 1200. In some examples, the obstacle avoidance component(s) 132 may be used independently of components, features, and/or functionality of the vehicle 1200 that is required to obey traffic rules and drive courteously. In such examples, the obstacle avoidance component(s) may ignore traffic laws, rules of the road, and courteous driving norms in order to ensure that collisions do not occur between the vehicle 1200 and any objects. As such, the obstacle avoidance layer may be a separate layer from the rules of the road layer, and the obstacle avoidance layer may ensure that the vehicle 1200 is only performing safe actions from an obstacle avoidance standpoint. The rules of the road layer, on the other hand, may ensure that vehicle obeys traffic laws and conventions, and observes lawful and conventional right of way (as described herein).

In some examples, the drivable or other navigable paths and/or the detected landmark(s) 115 may be used by the obstacle avoidance component(s) 132 in determining controls or actions to take. For example, the drivable paths may provide an indication to the obstacle avoidance component(s) 132 of where the vehicle 1200 may maneuver without striking any objects, protuberances, structures, and/or the like, or at least where no static structures may exist.

In non-limiting embodiments, the obstacle avoidance component(s) 132 may be implemented as a separate, discrete feature of the vehicle 1200. For example, the obstacle avoidance component(s) 132 may operate separately (e.g., in parallel with, prior to, and/or after) the planning layer, the control layer, the actuation layer, and/or other layers of the drive stack 122.

As such, the vehicle 1200 may use this information (e.g., as the edges, or rails of the paths) to navigate, plan, or otherwise perform one or more operations (e.g. lane keeping, lane changing, merging, splitting, etc.) within the environment.

Figure 10:
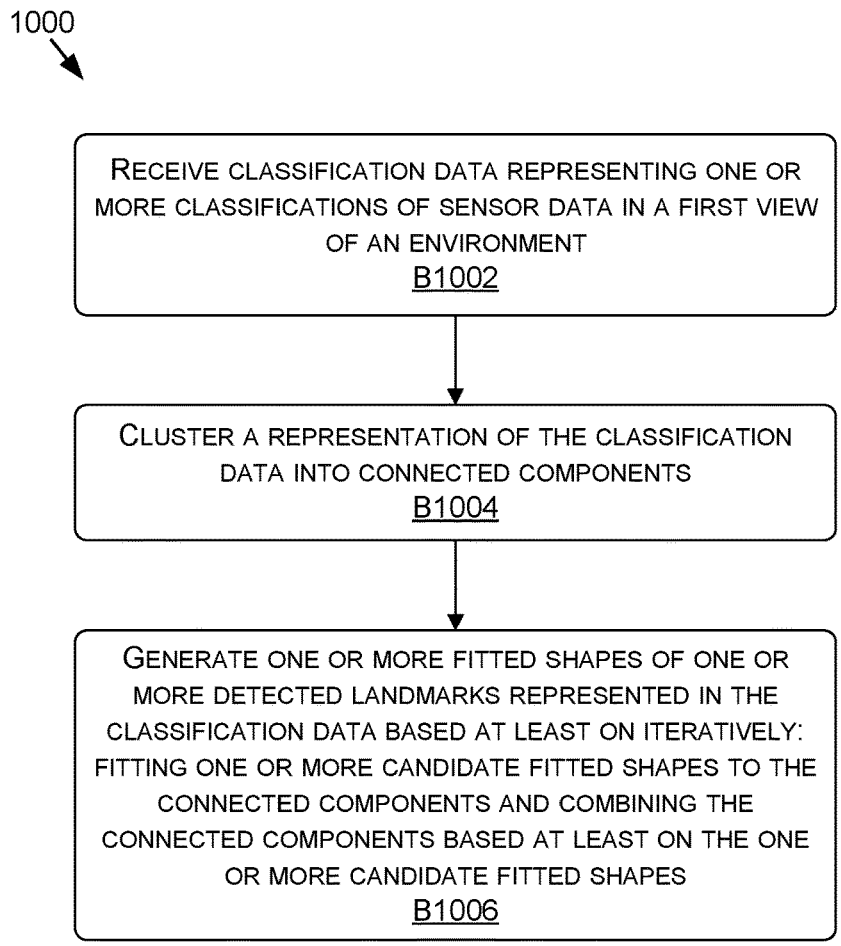
FIG. 10. is a flow diagram showing a method for generating one or more fitted shapes of detected landmarks using connected components, in accordance with some embodiments of the present disclosure.
Figure 11:
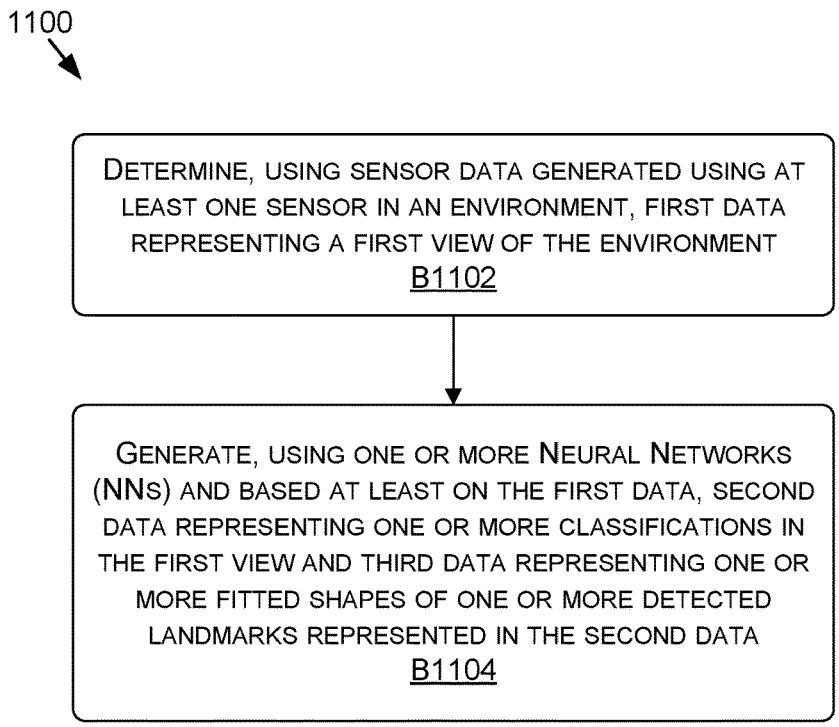
FIG. 11 is a flow diagram showing a method for generating one or more fitted shapes of detected landmarks using one or more neural networks, in accordance with some embodiments of the present disclosure.

Now referring to FIGS. 10 and 11, each block of methods 1000 and 1100, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 1000 and 1100 may be described, by way of example, with respect to the landmark detection and shape regression system of FIG. 1. However, these methods may additionally or alternatively be executed by any one system, or any combination of systems, including, but not limited to, those described herein.

FIG. 10 is a flow diagram showing a method 1000 for generating one or more fitted shapes of detected landmarks using connected components, in accordance with some embodiments of the present disclosure. The method 1000, at block B1002, includes receiving classification data representing one or more classifications of sensor data in a first view of an environment. For example, with respect to FIG. 2, the input generator 212 may receive the class confidence data 210 extracted by the one or more machine learning models 208.

The method 1000, at block B1004, includes clustering a representation of the classification data into connected components. For example, with respect to FIG. 2, the input generator 212 may process the sensor data 102 and/or the class confidence data 210 into the input data 218, and the clustering component 240 may perform any known connected components analysis to identify connected components in the input data 218. More specifically, the input generator 212 may associate classified pixels of the class confidence data 210 with corresponding measured 3D points (thereby generating classified measured 3D points), accumulate and/or ego-motion compensate classified measured 3D points, generate a projection image (e.g., for each class) representing the projected positions of classified measured 3D points and/or their corresponding predicted confidence values, and/or apply thresholding and/or dilation to convert each projection image into a binary mask. As such, the clustering component 240 may perform any known connected components analysis to identify connected components in the binary mask.

The method 1000, at block B1006, includes generating one or more fitted shapes of one or more detected landmarks represented in the classification data based at least on iteratively: fitting one or more candidate fitted shapes to the connected components and combining the connected components based at least on the one or more candidate fitted shapes. For example, with respect to FIG. 2, the iteration controller 270 may control one or more iterations of the shape fitting component 250 fitting shapes (e.g., polynomials, Bezier splines) to the connected components and the merging component 260 combining connected components.

FIG. 11 is a flow diagram showing a method 1100 for generating one or more fitted shapes of detected landmarks using one or more neural networks, in accordance with some embodiments of the present disclosure. The method 1100, at block B1102, includes determining, using sensor data generated using at least one sensor in an environment, first data representing a first view of the environment. For example, with respect to FIG. 1, sensor data 102 of a 3D environment (e.g., LiDAR data) may be collected, and the input generator 104 may process the sensor data 102 into the input data 106 having a format that the landmark detection and shape regression component 108 accepts (e.g., an accumulated, ego-motion-compensated, projected representation of measured 3D points, such as one or more projection images or tensors representing locations, intensities, elevations, and/or other characteristics of the measured 3D points). In some embodiments, such as those represented by FIG. 5, the input data 106 may include (e.g., in corresponding channels), or may be used to generate, a first projected 2D representation of measured 3D points in a first view 510 of the 3D environment, and a second projected 2D representation of measured 3D points in a second view 520 of the environment.

The method 1100, at block B1104, includes generating, using one or more Neural Networks (NNs) and based at least on the first data, second data representing one or more classifications in the first view and third data representing one or more fitted shapes of one or more detected landmarks represented in the second data. For example, with respect to FIG. 4, one or more machine learning models 408 may extract the class confidence data 410 and the shape regression data 412 from the input data 106. In some embodiments, the machine learning model(s) 408 jointly predict class confidence data 410 and shape regression data 412 using different output heads (as illustrated in FIG. 5). In some embodiments, the machine learning model(s) 408 include one or more machine learning models 208 that extract class confidence data 210 from the input data 106, followed by one or more machine learning models 914 that extract shape regression data 412 from a representation of the class confidence data 210 (as illustrated in FIG. 9).

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

FIG. 12A is an illustration of an example autonomous vehicle 1200, in accordance with some embodiments of the present disclosure. The autonomous vehicle 1200 (alternatively referred to herein as the "vehicle 1200") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1200 may be capable of functionality in accordance with one or more of Level 3-Level 5 of the autonomous driving levels. The vehicle 1200 may be capable of functionality in accordance with one or more of Level 1-Level 5 of the autonomous driving levels. For example, the vehicle 1200 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1200 or other machine, such as being fully autonomous, being highly autonomous, being conditionally autonomous, being partially autonomous, providing assistive autonomy, being semi-autonomous, being primarily autonomous, or other designation.

The vehicle 1200 may include components such as a chassis, a vehicle body, wheels (e.g., 2, 4, 6, 8, 18, etc.), tires, axles, and other components of a vehicle. The vehicle 1200 may include a propulsion system 1250, such as an internal combustion engine, hybrid electric power plant, an all-electric engine, and/or another propulsion system type. The propulsion system 1250 may be connected to a drive train of the vehicle 1200, which may include a transmission, to enable the propulsion of the vehicle 1200. The propulsion system 1250 may be controlled in response to receiving signals from the throttle/accelerator 1252.

A steering system 1254, which may include a steering wheel, may be used to steer the vehicle 1200 (e.g., along a desired path or route) when the propulsion system 1250 is operating (e.g., when the vehicle is in motion). The steering system 1254 may receive signals from a steering actuator 1256. The steering wheel may be optional for full automation (Level 5) functionality.

The brake sensor system 1246 may be used to operate the vehicle brakes in response to receiving signals from the brake actuators 1248 and/or brake sensors.

Controller(s) 1236, which may include one or more system on chips (SoCs) 1204 (FIG. 12C) and/or GPU(s), may provide signals (e.g., representative of commands) to one or more components and/or systems of the vehicle 1200. For example, the controller(s) may send signals to operate the vehicle brakes via one or more brake actuators 1248, to operate the steering system 1254 via one or more steering actuators 1256, to operate the propulsion system 1250 via one or more throttle/accelerators 1252. The controller(s) 1236 may include one or more onboard (e.g., integrated) computing devices (e.g., supercomputers) that process sensor signals, and output operation commands (e.g., signals representing commands) to enable autonomous driving and/or to assist a human driver in driving the vehicle 1200. The controller(s) 1236 may include a first controller 1236 for autonomous driving functions, a second controller 1236 for functional safety functions, a third controller 1236 for artificial intelligence functionality (e.g., computer vision), a fourth controller 1236 for infotainment functionality, a fifth controller 1236 for redundancy in emergency conditions, and/or other controllers. In some examples, a single controller 1236 may handle two or more of the above functionalities, two or more controllers 1236 may handle a single functionality, and/or any combination thereof.

The controller(s) 1236 may provide the signals for controlling one or more components and/or systems of the vehicle 1200 in response to sensor data received from one or more sensors (e.g., sensor inputs). The sensor data may be received from, for example and without limitation, global navigation satellite systems ("GNSS") sensor(s) 1258 (e.g., Global Positioning System sensor(s)), RADAR sensor(s) 1260, ultrasonic sensor(s) 1262, LIDAR sensor(s) 1264, inertial measurement unit (IMU) sensor(s) 1266 (e.g., accelerometer(s), gyroscope(s), magnetic compass(es), magnetometer(s), etc.), microphone(s) 1296, stereo camera(s) 1268, wide-view camera(s) 1270 (e.g., fisheye cameras), infrared camera(s) 1272, surround camera(s) 1274 (e.g., 360 degree cameras), long-range and/or mid-range camera(s) 1298, speed sensor(s) 1244 (e.g., for measuring the speed of the vehicle 1200), vibration sensor(s) 1242, steering sensor(s) 1240, brake sensor(s) (e.g., as part of the brake sensor system 1246), and/or other sensor types.

One or more of the controller(s) 1236 may receive inputs (e.g., represented by input data) from an instrument cluster 1232 of the vehicle 1200 and provide outputs (e.g., represented by output data, display data, etc.) via a human-machine interface (HMI) display 1234, an audible annunciator, a loudspeaker, and/or via other components of the vehicle 1200. The outputs may include information such as vehicle velocity, speed, time, map data (e.g., the High Definition ("HD") map 1222 of FIG. 12C), location data (e.g., the vehicle's 1200 location, such as on a map), direction, location of other vehicles (e.g., an occupancy grid), information about objects and status of objects as perceived by the controller(s) 1236, etc. For example, the HMI display 1234 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1200 further includes a network interface 1222 which may use one or more wireless antenna(s) 1226 and/or modem(s) to communicate over one or more networks. For example, the network interface 1222 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1226 may also enable communication between objects in the environment (e.g., vehicles, mobile devices, etc.), using local area network(s), such as BLUETOOTH®, BLUETOOTH Low Energe ("LE), Z-WAVE®, ZIGBEE®, etc., and/or low power wide-area network(s) ("LPWANs"), such as LORAWAN®, SIGFOX®, etc.

FIG. 12B is an example of camera locations and fields of view for the example autonomous vehicle 1200 of FIG. 12A, in accordance with some embodiments of the present disclosure. The cameras and respective fields of view are one example embodiment and are not intended to be limiting. For example, additional and/or alternative cameras may be included and/or the cameras may be located at different locations on the vehicle 1200.

The camera types for the cameras may include, but are not limited to, digital cameras that may be adapted for use with the components and/or systems of the vehicle 1200. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a FOVEON X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1200 (e.g., front-facing cameras) may be used for surround view, to help identify forward facing paths and obstacles, as well aid in, with the help of one or more controllers 1236 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1270 that may be used to perceive objects coming into view from the periphery (e.g., pedestrians, crossing traffic or bicycles). Although only one wide-view camera is illustrated in FIG. 12B, there may be any number (including zero) of wide-view cameras 1270 on the vehicle 1200. In addition, any number of long-range camera(s) 1298 (e.g., a long-view stereo camera pair) may be used for depth-based object detection, especially for objects for which a neural network has not yet been trained. The long-range camera(s) 1298 may also be used for object detection and classification, as well as basic object tracking.

Any number of stereo cameras 1268 may also be included in a front-facing configuration. In at least one embodiment, one or more of stereo camera(s) 1268 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1268 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1268 may be used in addition to, or alternatively from, those described herein.

Cameras with a field of view that include portions of the environment to the side of the vehicle 1200 (e.g., side-view cameras) may be used for surround view, providing information used to create and update the occupancy grid, as well as to generate side impact collision warnings. For example, surround camera(s) 1274 (e.g., four surround cameras 1274 as illustrated in FIG. 12B) may be positioned to on the vehicle 1200. The surround camera(s) 1274 may include wide-view camera(s) 1270, fisheye camera(s), 360 degree camera(s), and/or the like. Four example, four fisheye cameras may be positioned on the vehicle's front, rear, and sides. In an alternative arrangement, the vehicle may use three surround camera(s) 1274 (e.g., left, right, and rear), and may leverage one or more other camera(s) (e.g., a forward-facing camera) as a fourth surround view camera.

Cameras with a field of view that include portions of the environment to the rear of the vehicle 1200 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1298, stereo camera(s) 1268), infrared camera(s) 1272, etc.), as described herein.

FIG. 12C is a block diagram of an example system architecture for the example autonomous vehicle 1200 of FIG. 12A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1200 in FIG. 12C are illustrated as being connected via bus 1202. The bus 1202 may include a Controller Area Network (CAN) data interface (alternatively referred to herein as a "CAN bus"). A CAN may be a network inside the vehicle 1200 used to aid in control of various features and functionality of the vehicle 1200, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1202 is described herein as being a CAN bus, this is not intended to be limiting. For example, in addition to, or alternatively from, the CAN bus, FlexRay and/or Ethernet may be used. Additionally, although a single line is used to represent the bus 1202, this is not intended to be limiting. For example, there may be any number of busses 1202, which may include one or more CAN busses, one or more FlexRay busses, one or more Ethernet busses, and/or one or more other types of busses using a different protocol. In some examples, two or more busses 1202 may be used to perform different functions, and/or may be used for redundancy. For example, a first bus 1202 may be used for collision avoidance functionality and a second bus 1202 may be used for actuation control. In any example, each bus 1202 may communicate with any of the components of the vehicle 1200, and two or more busses 1202 may communicate with the same components. In some examples, each SoC 1204, each controller 1236, and/or each computer within the vehicle may have access to the same input data (e.g., inputs from sensors of the vehicle 1200), and may be connected to a common bus, such the CAN bus.

The vehicle 1200 may include one or more controller(s) 1236, such as those described herein with respect to FIG. 12A. The controller(s) 1236 may be used for a variety of functions. The controller(s) 1236 may be coupled to any of the various other components and systems of the vehicle 1200, and may be used for control of the vehicle 1200, artificial intelligence of the vehicle 1200, infotainment for the vehicle 1200, and/or the like.

The vehicle 1200 may include a system(s) on a chip (SoC) 1204. The SoC 1204 may include CPU(s) 1206, GPU(s) 1208, processor(s) 1210, cache(s) 1212, accelerator(s) 1214, data store(s) 1216, and/or other components and features not illustrated. The SoC(s) 1204 may be used to control the vehicle 1200 in a variety of platforms and systems. For example, the SoC(s) 1204 may be combined in a system (e.g., the system of the vehicle 1200) with an HD map 1222 which may obtain map refreshes and/or updates via a network interface 1222 from one or more servers (e.g., server(s) 1278 of FIG. 12D).

The CPU(s) 1206 may include a CPU cluster or CPU complex (alternatively referred to herein as a "CCPLEX"). The CPU(s) 1206 may include multiple cores and/or L2 caches. For example, in some embodiments, the CPU(s) 1206 may include eight cores in a coherent multi-processor configuration. In some embodiments, the CPU(s) 1206 may include four dual-core clusters where each cluster has a dedicated L2 cache (e.g., a 2 MB L2 cache). The CPU(s) 1206 (e.g., the CCPLEX) may be configured to support simultaneous cluster operation enabling any combination of the clusters of the CPU(s) 1206 to be active at any given time.

The CPU(s) 1206 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1206 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1208 may include an integrated GPU (alternatively referred to herein as an "iGPU"). The GPU(s) 1208 may be programmable and may be efficient for parallel workloads. The GPU(s) 1208, in some examples, may use an enhanced tensor instruction set. The GPU(s) 1208 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1208 may include at least eight streaming microprocessors. The GPU(s) 1208 may use compute application programming interface(s) (API(s)). In addition, the GPU(s) 1208 may use one or more parallel computing platforms and/or programming models (e.g., NVIDIA's CUDA).

The GPU(s) 1208 may be power-optimized for best performance in automotive and embedded use cases. For example, the GPU(s) 1208 may be fabricated on a Fin field-effect transistor (FinFET). However, this is not intended to be limiting and the GPU(s) 1208 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1208 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1208 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1208 to access the CPU(s) 1206 page tables directly. In such examples, when the GPU(s) 1208 memory management unit (MMU) experiences a miss, an address translation request may be transmitted to the CPU(s) 1206. In response, the CPU(s) 1206 may look in its page tables for the virtual-to-physical mapping for the address and transmits the translation back to the GPU(s) 1208. As such, unified memory technology may allow a single unified virtual address space for memory of both the CPU(s) 1206 and the GPU(s) 1208, thereby simplifying the GPU(s) 1208 programming and porting of applications to the GPU(s) 1208.

In addition, the GPU(s) 1208 may include an access counter that may keep track of the frequency of access of the GPU(s) 1208 to memory of other processors. The access counter may help ensure that memory pages are moved to the physical memory of the processor that is accessing the pages most frequently.

The SoC(s) 1204 may include any number of cache(s) 1212, including those described herein. For example, the cache(s) 1212 may include an L3 cache that is available to both the CPU(s) 1206 and the GPU(s) 1208 (e.g., that is connected both the CPU(s) 1206 and the GPU(s) 1208). The cache(s) 1212 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1204 may include an arithmetic logic unit(s) (ALU(s)) which may be leveraged in performing processing with respect to any of the variety of tasks or operations of the vehicle 1200—such as processing DNNs. In addition, the SoC(s) 1204 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1206 and/or GPU(s) 1208.

The SoC(s) 1204 may include one or more accelerators 1214 (e.g., hardware accelerators, software accelerators, or a combination thereof). For example, the SoC(s) 1204 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1208 and to off-load some of the tasks of the GPU(s) 1208 (e.g., to free up more cycles of the GPU(s) 1208 for performing other tasks). As an example, the accelerator(s) 1214 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1214 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1208, and by using an inference accelerator, for example, a designer may target either the DLA(s) or the GPU(s) 1208 for any function. For example, the designer may focus processing of CNNs and floating point operations on the DLA(s) and leave other functions to the GPU(s) 1208 and/or other accelerator(s) 1214.

The accelerator(s) 1214 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1206. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1214 (e.g., the hardware acceleration cluster) may include a computer vision network on-chip and SRAM, for providing a high-bandwidth, low latency SRAM for the accelerator(s) 1214. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1204 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1214 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1266 output that correlates with the vehicle 1200 orientation, distance, 3D location estimates of the object obtained from the neural network and/or other sensors (e.g., LIDAR sensor(s) 1264 or RADAR sensor(s) 1260), among others.

The SoC(s) 1204 may include data store(s) 1216 (e.g., memory). The data store(s) 1216 may be on-chip memory of the SoC(s) 1204, which may store neural networks to be executed on the GPU and/or the DLA. In some examples, the data store(s) 1216 may be large enough in capacity to store multiple instances of neural networks for redundancy and safety. The data store(s) 1212 may comprise L2 or L3 cache(s) 1212. Reference to the data store(s) 1216 may include reference to the memory associated with the PVA, DLA, and/or other accelerator(s) 1214, as described herein.

The SoC(s) 1204 may include one or more processor(s) 1210 (e.g., embedded processors). The processor(s) 1210 may include a boot and power management processor that may be a dedicated processor and subsystem to handle boot power and management functions and related security enforcement. The boot and power management processor may be a part of the SoC(s) 1204 boot sequence and may provide runtime power management services. The boot power and management processor may provide clock and voltage programming, assistance in system low power state transitions, management of SoC(s) 1204 thermals and temperature sensors, and/or management of the SoC(s) 1204 power states. Each temperature sensor may be implemented as a ring-oscillator whose output frequency is proportional to temperature, and the SoC(s) 1204 may use the ring-oscillators to detect temperatures of the CPU(s) 1206, GPU(s) 1208, and/or accelerator(s) 1214. If temperatures are determined to exceed a threshold, the boot and power management processor may enter a temperature fault routine and put the SoC(s) 1204 into a lower power state and/or put the vehicle 1200 into a chauffeur to safe stop mode (e.g., bring the vehicle 1200 to a safe stop).

The processor(s) 1210 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1210 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1210 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1210 may further include a real-time camera engine that may include a dedicated processor subsystem for handling real-time camera management.

The processor(s) 1210 may further include a high-dynamic range signal processor that may include an image signal processor that is a hardware engine that is part of the camera processing pipeline.

The processor(s) 1210 may include a video image compositor that may be a processing block (e.g., implemented on a microprocessor) that implements video post-processing functions needed by a video playback application to produce the final image for the player window. The video image compositor may perform lens distortion correction on wide-view camera(s) 1270, surround camera(s) 1274, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1208 is not required to continuously render new surfaces. Even when the GPU(s) 1208 is powered on and active doing 3D rendering, the video image compositor may be used to offload the GPU(s) 1208 to improve performance and responsiveness.

The SoC(s) 1204 may further include a mobile industry processor interface (MIPI) camera serial interface for receiving video and input from cameras, a high-speed interface, and/or a video input block that may be used for camera and related pixel input functions. The SoC(s) 1204 may further include an input/output controller(s) that may be controlled by software and may be used for receiving I/O signals that are uncommitted to a specific role.

The SoC(s) 1204 may further include a broad range of peripheral interfaces to enable communication with peripherals, audio codecs, power management, and/or other devices. The SoC(s) 1204 may be used to process data from cameras (e.g., connected over Gigabit Multimedia Serial Link and Ethernet), sensors (e.g., LIDAR sensor(s) 1264, RADAR sensor(s) 1260, etc. that may be connected over Ethernet), data from bus 1202 (e.g., speed of vehicle 1200, steering wheel position, etc.), data from GNSS sensor(s) 1258 (e.g., connected over Ethernet or CAN bus). The SoC(s) 1204 may further include dedicated high-performance mass storage controllers that may include their own DMA engines, and that may be used to free the CPU(s) 1206 from routine data management tasks.

The SoC(s) 1204 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1204 may be faster, more reliable, and even more energy-efficient and space-efficient than conventional systems. For example, the accelerator(s) 1214, when combined with the CPU(s) 1206, the GPU(s) 1208, and the data store(s) 1216, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1220) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1208.

In some examples, a CNN for facial recognition and vehicle owner identification may use data from camera sensors to identify the presence of an authorized driver and/or owner of the vehicle 1200. The always on sensor processing engine may be used to unlock the vehicle when the owner approaches the driver door and turn on the lights, and, in security mode, to disable the vehicle when the owner leaves the vehicle. In this way, the SoC(s) 1204 provide for security against theft and/or carjacking.

In another example, a CNN for emergency vehicle detection and identification may use data from microphones 1296 to detect and identify emergency vehicle sirens. In contrast to conventional systems, that use general classifiers to detect sirens and manually extract features, the SoC(s) 1204 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1258. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1262, until the emergency vehicle(s) passes.

The vehicle may include a CPU(s) 1218 (e.g., discrete CPU(s), or dCPU(s)), that may be coupled to the SoC(s) 1204 via a high-speed interconnect (e.g., PCIe). The CPU(s) 1218 may include an X86 processor, for example. The CPU(s) 1218 may be used to perform any of a variety of functions, including arbitrating potentially inconsistent results between ADAS sensors and the SoC(s) 1204, and/or monitoring the status and health of the controller(s) 1236 and/or infotainment SoC 1230, for example.

The vehicle 1200 may include a GPU(s) 1220 (e.g., discrete GPU(s), or dGPU(s)), that may be coupled to the SoC(s) 1204 via a high-speed interconnect (e.g., NVIDIA's NVLINK). The GPU(s) 1220 may provide additional artificial intelligence functionality, such as by executing redundant and/or different neural networks, and may be used to train and/or update neural networks based on input (e.g., sensor data) from sensors of the vehicle 1200.

The vehicle 1200 may further include the network interface 1222 which may include one or more wireless antennas 1226 (e.g., one or more wireless antennas for different communication protocols, such as a cellular antenna, a BLUETOOTH antenna, etc.). The network interface 1222 may be used to enable wireless connectivity over the Internet with the cloud (e.g., with the server(s) 1278 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1200 information about vehicles in proximity to the vehicle 1200 (e.g., vehicles in front of, on the side of, and/or behind the vehicle 1200). This functionality may be part of a cooperative adaptive cruise control functionality of the vehicle 1200.

The network interface 1222 may include a SoC that provides modulation and demodulation functionality and enables the controller(s) 1236 to communicate over wireless networks. The network interface 1222 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, BLUETOOTH, BLUETOOTH LE, Wi-Fi, Z-WAVE, ZIGBEE, LORAWAN, and/or other wireless protocols.

The vehicle 1200 may further include data store(s) 1228 which may include off-chip (e.g., off the SoC(s) 1204) storage. The data store(s) 1228 may include one or more storage elements including RAM, SRAM, DRAM, VRAM, Flash, hard disks, and/or other components and/or devices that may store at least one bit of data.

The vehicle 1200 may further include GNSS sensor(s) 1258. The GNSS sensor(s) 1258 (e.g., GPS, assisted GPS sensors, differential GPS (DGPS) sensors, etc.), to assist in mapping, perception, occupancy grid generation, and/or path planning functions. Any number of GNSS sensor(s) 1258 may be used, including, for example and without limitation, a GPS using a USB connector with an Ethernet to Serial (RS-232) bridge.

The vehicle 1200 may further include RADAR sensor(s) 1260. The RADAR sensor(s) 1260 may be used by the vehicle 1200 for long-range vehicle detection, even in darkness and/or severe weather conditions. RADAR functional safety levels may be ASIL B. The RADAR sensor(s) 1260 may use the CAN and/or the bus 1202 (e.g., to transmit data generated by the RADAR sensor(s) 1260) for control and to access object tracking data, with access to Ethernet to access raw data in some examples. A wide variety of RADAR sensor types may be used. For example, and without limitation, the RADAR sensor(s) 1260 may be suitable for front, rear, and side RADAR use. In some example, Pulse Doppler RADAR sensor(s) are used.

The RADAR sensor(s) 1260 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1260 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1200 surroundings at higher speeds with minimal interference from traffic in adjacent lanes. The other two antennae may expand the field of view, making it possible to quickly detect vehicles entering or leaving the vehicle's 1200 lane.

Mid-range RADAR systems may include, as an example, a range of up to 1260 m (front) or 80 m (rear), and a field of view of up to 42 degrees (front) or 1250 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1200 may further include ultrasonic sensor(s) 1262. The ultrasonic sensor(s) 1262, which may be positioned at the front, back, and/or the sides of the vehicle 1200, may be used for park assist and/or to create and update an occupancy grid. A wide variety of ultrasonic sensor(s) 1262 may be used, and different ultrasonic sensor(s) 1262 may be used for different ranges of detection (e.g., 2.5 m, 4 m). The ultrasonic sensor(s) 1262 may operate at functional safety levels of ASIL B.

The vehicle 1200 may include LIDAR sensor(s) 1264. The LIDAR sensor(s) 1264 may be used for object and pedestrian detection, emergency braking, collision avoidance, and/or other functions. The LIDAR sensor(s) 1264 may be functional safety level ASIL B. In some examples, the vehicle 1200 may include multiple LIDAR sensors 1264 (e.g., two, four, six, etc.) that may use Ethernet (e.g., to provide data to a Gigabit Ethernet switch).

In some examples, the LIDAR sensor(s) 1264 may be capable of providing a list of objects and their distances for a 360-degree field of view. Commercially available LIDAR sensor(s) 1264 may have an advertised range of approximately 1200 m, with an accuracy of 2 cm-3 cm, and with support for a 1200 Mbps Ethernet connection, for example. In some examples, one or more non-protruding LIDAR sensors 1264 may be used. In such examples, the LIDAR sensor(s) 1264 may be implemented as a small device that may be embedded into the front, rear, sides, and/or corners of the vehicle 1200. The LIDAR sensor(s) 1264, in such examples, may provide up to a 120-degree horizontal and 35-degree vertical field-of-view, with a 200 m range even for low-reflectivity objects. Front-mounted LIDAR sensor(s) 1264 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion—free images of the surroundings to be generated with every laser flash. In some examples, four flash LIDAR sensors may be deployed, one at each side of the vehicle 1200. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1264 may be less susceptible to motion blur, vibration, and/or shock.

The vehicle may further include IMU sensor(s) 1266. The IMU sensor(s) 1266 may be located at a center of the rear axle of the vehicle 1200, in some examples. The IMU sensor(s) 1266 may include, for example and without limitation, an accelerometer(s), a magnetometer(s), a gyroscope(s), a magnetic compass(es), and/or other sensor types. In some examples, such as in six-axis applications, the IMU sensor(s) 1266 may include accelerometers and gyroscopes, while in nine-axis applications, the IMU sensor(s) 1266 may include accelerometers, gyroscopes, and magnetometers.

In some embodiments, the IMU sensor(s) 1266 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1266 may enable the vehicle 1200 to estimate heading without requiring input from a magnetic sensor by directly observing and correlating the changes in velocity from GPS to the IMU sensor(s) 1266. In some examples, the IMU sensor(s) 1266 and the GNSS sensor(s) 1258 may be combined in a single integrated unit.

The vehicle may include microphone(s) 1296 placed in and/or around the vehicle 1200. The microphone(s) 1296 may be used for emergency vehicle detection and identification, among other things.

The vehicle may further include any number of camera types, including stereo camera(s) 1268, wide-view camera(s) 1270, infrared camera(s) 1272, surround camera(s) 1274, long-range and/or mid-range camera(s) 1298, and/or other camera types. The cameras may be used to capture image data around an entire periphery of the vehicle 1200. The types of cameras used depends on the embodiments and requirements for the vehicle 1200, and any combination of camera types may be used to provide the necessary coverage around the vehicle 1200. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 12A and FIG. 12B.

The vehicle 1200 may further include vibration sensor(s) 1242. The vibration sensor(s) 1242 may measure vibrations of components of the vehicle, such as the axle(s). For example, changes in vibrations may indicate a change in road surfaces. In another example, when two or more vibration sensors 1242 are used, the differences between the vibrations may be used to determine friction or slippage of the road surface (e.g., when the difference in vibration is between a power-driven axle and a freely rotating axle).

The vehicle 1200 may include an ADAS system 1238. The ADAS system 1238 may include a SoC, in some examples. The ADAS system 1238 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1260, LIDAR sensor(s) 1264, and/or a camera(s). The ACC systems may include longitudinal ACC and/or lateral ACC. Longitudinal ACC monitors and controls the distance to the vehicle immediately ahead of the vehicle 1200 and automatically adjust the vehicle speed to maintain a safe distance from vehicles ahead. Lateral ACC performs distance keeping, and advises the vehicle 1200 to change lanes when necessary. Lateral ACC is related to other ADAS applications such as LCA and CWS.

CACC uses information from other vehicles that may be received via the network interface 1222 and/or the wireless antenna(s) 1226 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1200), while the I2V communication concept provides information about traffic further ahead. CACC systems may include either or both I2V and V2V information sources. Given the information of the vehicles ahead of the vehicle 1200, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1260, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1260, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1200 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1200 if the vehicle 1200 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1260, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1200 is backing up. Some RCTW systems include AEB to ensure that the vehicle brakes are applied to avoid a crash. RCTW systems may use one or more rear-facing RADAR sensor(s) 1260, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1200, the vehicle 1200 itself must, in the case of conflicting results, decide whether to heed the result from a primary computer or a secondary computer (e.g., a first controller 1236 or a second controller 1236). For example, in some embodiments, the ADAS system 1238 may be a backup and/or secondary computer for providing perception information to a backup computer rationality module. The backup computer rationality monitor may run a redundant diverse software on hardware components to detect faults in perception and dynamic driving tasks. Outputs from the ADAS system 1238 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1204.

In other examples, ADAS system 1238 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1238 may be fed into the primary computer's perception block and/or the primary computer's dynamic driving task block. For example, if the ADAS system 1238 indicates a forward crash warning due to an object immediately ahead, the perception block may use this information when identifying objects. In other examples, the secondary computer may have its own neural network which is trained and thus reduces the risk of false positives, as described herein.

The vehicle 1200 may further include the infotainment SoC 1230 (e.g., an in-vehicle infotainment system (IVI)). Although illustrated and described as a SoC, the infotainment system may not be a SoC, and may include two or more discrete components. The infotainment SoC 1230 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1200. For example, the infotainment SoC 1230 may radios, disk players, navigation systems, video players, USB and BLUETOOTH connectivity, carputers, in-car entertainment, Wi-Fi, steering wheel audio controls, hands free voice control, a heads-up display (HUD), an HMI display 1234, a telematics device, a control panel (e.g., for controlling and/or interacting with various components, features, and/or systems), and/or other components. The infotainment SoC 1230 may further be used to provide information (e.g., visual and/or audible) to a user(s) of the vehicle, such as information from the ADAS system 1238, autonomous driving information such as planned vehicle maneuvers, trajectories, surrounding environment information (e.g., intersection information, vehicle information, road information, etc.), and/or other information.

The infotainment SoC 1230 may include GPU functionality. The infotainment SoC 1230 may communicate over the bus 1202 (e.g., CAN bus, Ethernet, etc.) with other devices, systems, and/or components of the vehicle 1200. In some examples, the infotainment SoC 1230 may be coupled to a supervisory MCU such that the GPU of the infotainment system may perform some self-driving functions in the event that the primary controller(s) 1236 (e.g., the primary and/or backup computers of the vehicle 1200) fail. In such an example, the infotainment SoC 1230 may put the vehicle 1200 into a chauffeur to safe stop mode, as described herein.

The vehicle 1200 may further include an instrument cluster 1232 (e.g., a digital dash, an electronic instrument cluster, a digital instrument panel, etc.). The instrument cluster 1232 may include a controller and/or supercomputer (e.g., a discrete controller or supercomputer). The instrument cluster 1232 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1230 and the instrument cluster 1232. In other words, the instrument cluster 1232 may be included as part of the infotainment SoC 1230, or vice versa.

FIG. 12D is a system diagram for communication between cloud-based server(s) and the example autonomous vehicle 1200 of FIG. 12A, in accordance with some embodiments of the present disclosure. The system 1276 may include server(s) 1278, network(s) 1290, and vehicles, including the vehicle 1200. The server(s) 1278 may include a plurality of GPUs 1284(A)-1284(H) (collectively referred to herein as GPUs 1284), PCIe switches 1282(A)-1282(H) (collectively referred to herein as PCIe switches 1282), and/or CPUs 1280(A)-1280(B) (collectively referred to herein as CPUs 1280). The GPUs 1284, the CPUs 1280, and the PCIe switches may be interconnected with high-speed interconnects such as, for example and without limitation, NVLink interfaces 1288 developed by NVIDIA and/or PCIe connections 1286. In some examples, the GPUs 1284 are connected via NVLink and/or NVSwitch SoC and the GPUs 1284 and the PCIe switches 1282 are connected via PCIe interconnects. Although eight GPUs 1284, two CPUs 1280, and two PCIe switches are illustrated, this is not intended to be limiting. Depending on the embodiment, each of the server(s) 1278 may include any number of GPUs 1284, CPUs 1280, and/or PCIe switches. For example, the server(s) 1278 may each include eight, sixteen, thirty-two, and/or more GPUs 1284.

The server(s) 1278 may receive, over the network(s) 1290 and from the vehicles, image data representative of images showing unexpected or changed road conditions, such as recently commenced road-work. The server(s) 1278 may transmit, over the network(s) 1290 and to the vehicles, neural networks 1292, updated neural networks 1292, and/or map information 1294, including information regarding traffic and road conditions. The updates to the map information 1294 may include updates for the HD map 1222, such as information regarding construction sites, potholes, detours, flooding, and/or other obstructions. In some examples, the neural networks 1292, the updated neural networks 1292, and/or the map information 1294 may have resulted from new training and/or experiences represented in data received from any number of vehicles in the environment, and/or based on training performed at a datacenter (e.g., using the server(s) 1278 and/or other servers).

The server(s) 1278 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1290, and/or the machine learning models may be used by the server(s) 1278 to remotely monitor the vehicles.

In some examples, the server(s) 1278 may receive data from the vehicles and apply the data to up-to-date real-time neural networks for real-time intelligent inferencing. The server(s) 1278 may include deep-learning supercomputers and/or dedicated AI computers powered by GPU(s) 1284, such as a DGX and DGX Station machines developed by NVIDIA. However, in some examples, the server(s) 1278 may include deep learning infrastructure that use only CPU-powered datacenters.

The deep-learning infrastructure of the server(s) 1278 may be capable of fast, real-time inferencing, and may use that capability to evaluate and verify the health of the processors, software, and/or associated hardware in the vehicle 1200. For example, the deep-learning infrastructure may receive periodic updates from the vehicle 1200, such as a sequence of images and/or objects that the vehicle 1200 has located in that sequence of images (e.g., via computer vision and/or other machine learning object classification techniques). The deep-learning infrastructure may run its own neural network to identify the objects and compare them with the objects identified by the vehicle 1200 and, if the results do not match and the infrastructure concludes that the AI in the vehicle 1200 is malfunctioning, the server(s) 1278 may transmit a signal to the vehicle 1200 instructing a fail-safe computer of the vehicle 1200 to assume control, notify the passengers, and complete a safe parking maneuver.

For inferencing, the server(s) 1278 may include the GPU(s) 1284 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 13:
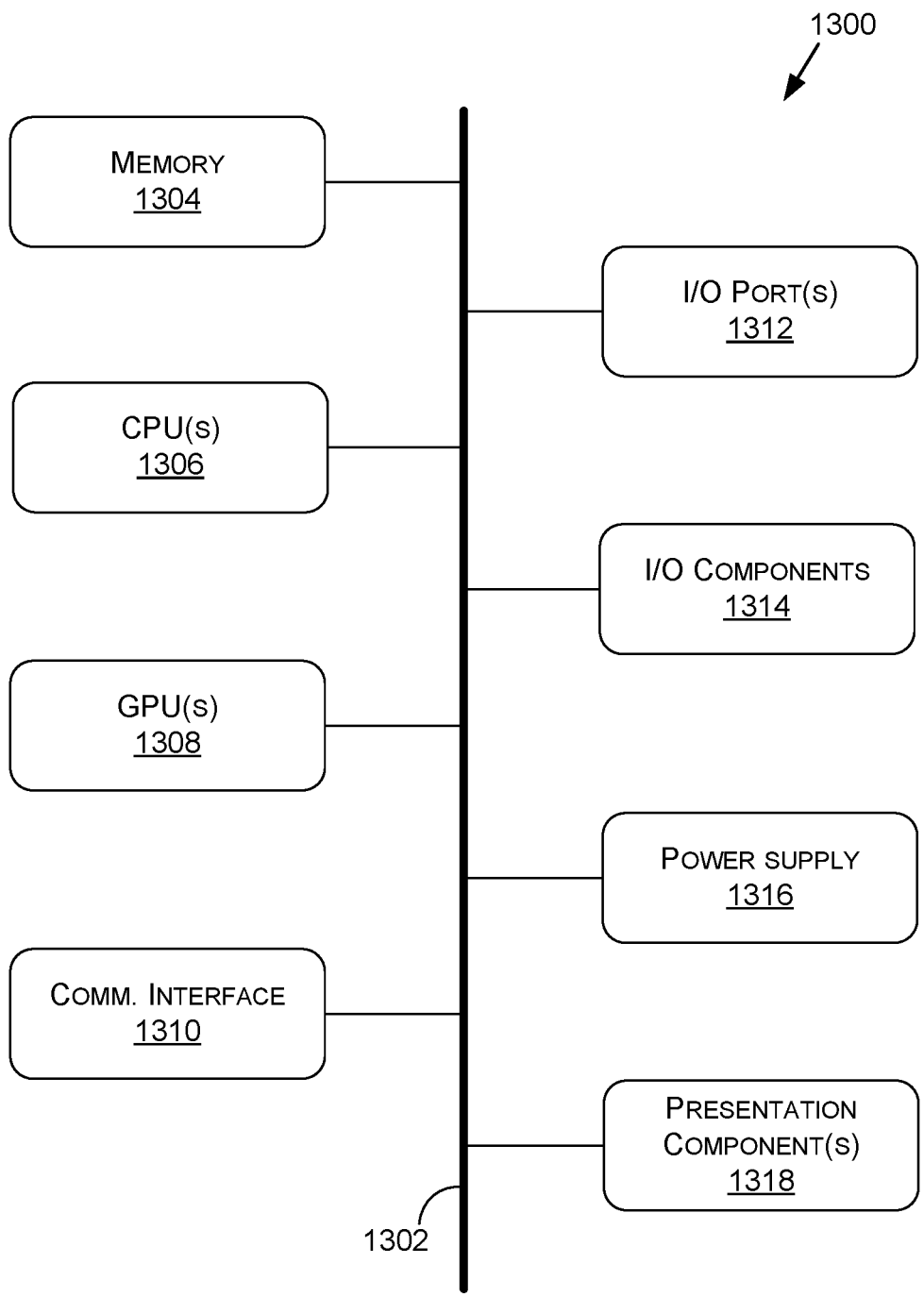
FIG. 13 is a block diagram of an example computing device suitable for use in implementing some embodiments of the present disclosure.

FIG. 13 is a block diagram of an example computing device(s) 1300 suitable for use in implementing some embodiments of the present disclosure. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more vGPUs, one or more of the CPUs 1306 may comprise one or more vCPUs, and/or one or more of the logic units 1320 may comprise one or more virtual logic units. As such, a computing device(s) 1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-WAVE, BLUETOOTH, BLUETOOTH LE, ZIGBEE, etc.), wired networks (e.g., communicating over Ethernet or InfiniBand), low-power wide-area networks (e.g., LORAWAN, SIGFOX, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.).

Example Data Center

Figure 14:
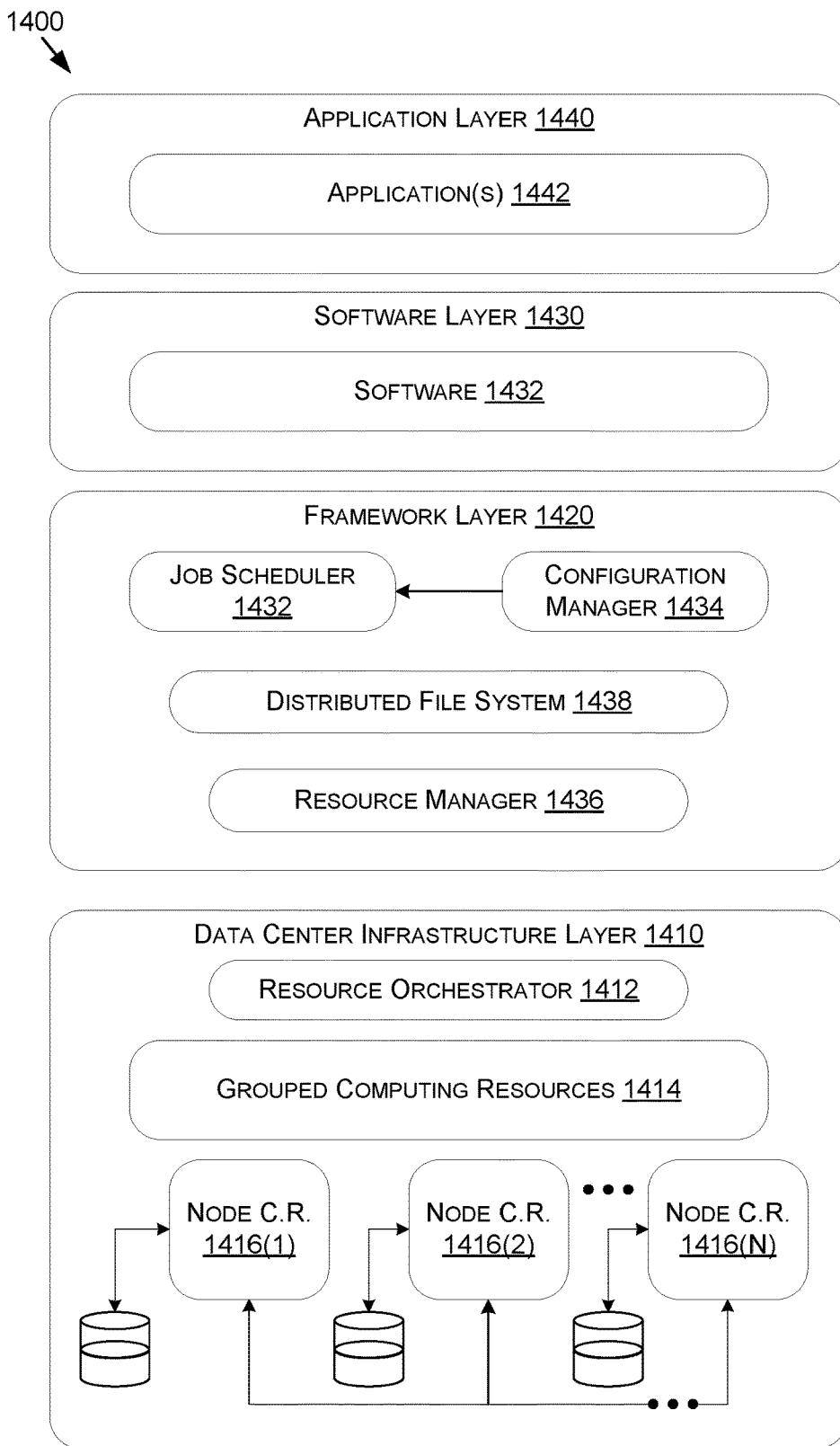
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O)

devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161(N) may include one or more virtual components, such as vGPUs, vCPUs, and/or the like, and/or one or more of the node C.R.s 1416(1)-1416(N) may correspond to a virtual machine (VM).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1433, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application(s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1433 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1433. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416(1)-1416(N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underutilized and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
  clustering a representation of classification data into groups of connected pixels of a common class, the classification data representing one or more classifications of sensor data generated using one or more sensors of an ego-machine;
  generating one or more fitted shapes of one or more detected landmarks represented by the classification data based at least on performing one or more iterations of:
    fitting one or more candidate fitted shapes to the groups of connected pixels of the common class; and
    combining the groups of connected pixels of the common class based at least on the one or more candidate fitted shapes; and
  executing one or more navigation or localization operations of the ego-machine based at least on the one or more fitted shapes of the one or more detected landmarks.

2. The method of claim 1, further comprising generating the classification data based on at least on processing, using one or more neural networks, a projected representation of LiDAR data accumulated over one or more spins of a LiDAR sensor.

3. The method of claim 1, further comprising generating the representation of the classification data based at least on thresholding and dilating the classification data.

4. The method of claim 1, wherein (i) the classification data represents one or more detected lane lines, and the generating the one or more fitted shapes comprises fitting one or more polynomials to the groups of connected pixels of the common class, or (ii) the classification data represents one or more detected poles or traffic lights, and the generating the one or more fitted shapes comprises fitting one or more circles to the groups of connected pixels of the common class.

5. The method of claim 1, wherein the generating the one or more fitted shapes comprises:
fitting at least one individual polynomial of one or more polynomials based at least on sampling a centroid pixel of a connected component of the groups of connected pixels of the common class;
sampling a number of random pixels from the connected component; and
fitting the at least one individual polynomial to the centroid pixel and the random pixels.

6. The method of claim 1, wherein the generating the one or more fitted shapes comprises determining not to fit a candidate shape to one or more of the groups of connected pixels of the common class having an area less than a threshold area.

7. The method of claim 1, wherein the combining the groups of connected pixels of the common class comprises absorbing a first connected component into a second connected component having a candidate fitted shape based at least on the candidate fitted shape of the second connected component intersecting the first connected component and having a higher weight than other candidate fitted shapes that intersect the first connected component.

8. The method of claim 1, wherein the combining the groups of connected pixels of the common class comprises weighting the one or more candidate fitted shapes based at least on a number and an area of a set of the groups of connected pixels of the common class intersected by individual candidate fitted shapes of the one or more candidate fitted shapes.

9. The method of claim 1, wherein the combining the groups of connected pixels of the common class comprises:
determining whether a candidate fitted shape of the one or more candidate fitted shapes intersects a connected component of the groups of connected pixels of the common class based at least on sampling a centroid pixel and a number of random pixels of the connected component; and
evaluating whether the centroid pixel and the random pixels are within a threshold distance of the candidate fitted shape.

10. The method of claim 1, wherein the method is performed by at least one of:
a control system for an autonomous or semi-autonomous machine;
a perception system for an autonomous or semi-autonomous machine;
a system for performing simulation operations;
a system for performing real-time streaming;
a system for generating or presenting one or more of augmented reality content, virtual reality content, or mixed reality content;
a system for performing digital twin operations;
a system for performing deep learning operations;
a system implemented using an edge device;
a system implemented using a robot;
a system incorporating one or more virtual machines (VMs);
a system implemented at least partially in a data center;
a system for performing light transport simulation;
a system for performing collaborative content creation for 3D assets;
a system for generating synthetic data; or
a system implemented at least partially using cloud computing resources.

11. A processor comprising:
one or more processing units to:
cluster a representation of classification data into one or more groups of connected pixels, the classification data representing one or more classifications of sensor data generated using one or more sensors of an ego-machine;
generate one or more fitted shapes of one or more detected landmarks represented in the classification data based at least on iteratively fitting one or more candidate fitted shapes to the one or more groups of connected pixels; and
execute one or more control operations of the ego-machine based at least on the one or more fitted shapes of the one or more detected landmarks.

12. The processor of claim 11, the one or more processing units further to generate the representation of the classification data based at least on thresholding and dilating the classification data.

13. The processor of claim 11, wherein (i) the classification data represents one or more detected lane lines, and the one or more processing units are further to generate the one or more fitted shapes based at least on fitting one or more polynomials to the one or more groups of connected pixels, or (ii) the classification data represents one or more detected poles or traffic lights, and the one or more processing units are further to generate the one or more fitted shapes based at least on fitting one or more circles to the one or more groups of connected pixels.

14. The processor of claim 11, the one or more processing units further to generate the one or more fitted shapes based at least on determining not to fit a candidate shape to at least one of the one or more groups of connected pixels having an area less than a threshold area.

15. The processor of claim 11, the one or more processing units further to generate the one or more fitted shapes based at least on absorbing a first group of connected pixels into a second group of connected pixels having a candidate fitted shape based at least on the candidate fitted shape of the second group of connected pixels intersecting the first group of connected pixels and having a higher weight than other candidate fitted shapes that intersect the first group of connected pixels.

16. The processor of claim 11, the one or more processing units further to generate the one or more fitted shapes based at least on weighting the one or more candidate fitted shapes based at least on a number and an area of a set of the one or more groups of connected pixels intersected by individual candidate fitted shapes of the one or more candidate fitted shapes.

17. The processor of claim 11, the one or more processing units further to generate the one or more fitted shapes based at least on determining whether a candidate fitted shape of the one or more candidate fitted shapes intersects a group of connected pixels of the one or more groups of connected pixels by: sampling a centroid pixel and a number of random pixels of the group of connected pixels, and evaluating whether the centroid pixel and the random pixels are within a threshold distance of the candidate fitted shape.

18. The processor of claim 11, wherein the processor is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system for performing remote operations;
- a system for performing real-time streaming;
- a system for generating or presenting one or more of augmented reality content, virtual reality content, or mixed reality content;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

19. A system comprising:
one or more processing units to:
- cluster a representation of classification data, representing one or more classifications of sensor data of an ego-machine, into groups of connected pixels of a common class;
- generate one or more fitted shapes of one or more detected landmarks represented by the classification data based at least on fitting one or more candidate fitted shapes to the groups of connected pixels and combining the groups of connected pixels of the common class based at least on the one or more candidate fitted shapes; and
- execute one or more operations associated with at least one of navigation or localization of the ego-machine based at least on the one or more fitted shapes of the one or more detected landmarks.

20. The system of claim 19, wherein the system is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system for performing real-time streaming;
- a system for generating or presenting one or more of augmented reality content, virtual reality content, or mixed reality content;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

* * * * *